(12) United States Patent
Kraning et al.

(10) Patent No.: US 10,965,707 B2
(45) Date of Patent: Mar. 30, 2021

(54) CORRELATION-DRIVEN THREAT ASSESSMENT AND REMEDIATION

(71) Applicant: Expanse, Inc., San Francisco, CA (US)

(72) Inventors: Matthew Kraning, San Francisco, CA (US); Gregory Heon, San Francisco, CA (US); Pamela Toman, San Francisco, CA (US)

(73) Assignee: EXPANSE, INC., San Francisco, CA (US)

( * ) Notice: Subject to any disclaimer, the term of this patent is extended or adjusted under 35 U.S.C. 154(b) by 371 days.

(21) Appl. No.: 15/984,030

(22) Filed: May 18, 2018

(65) Prior Publication Data

US 2018/0337941 A1   Nov. 22, 2018

Related U.S. Application Data

(60) Provisional application No. 62/508,298, filed on May 18, 2017, provisional application No. 62/586,669, filed on Nov. 15, 2017.

(51) Int. Cl.
*H04L 29/06*     (2006.01)
*H04L 12/26*     (2006.01)
*H04L 12/24*     (2006.01)

(52) U.S. Cl.
CPC ........ *H04L 63/1433* (2013.01); *H04L 43/026* (2013.01); *H04L 43/062* (2013.01);
(Continued)

(58) Field of Classification Search
CPC ............. H04L 63/1433; H04L 63/0227; H04L 63/1408; H04L 43/026; H04L 43/062;
(Continued)

(56) References Cited

U.S. PATENT DOCUMENTS 7,370,356 B1   5/2008   Guo
8,032,594 B2   10/2011  Helsper et al.
(Continued)

OTHER PUBLICATIONS

Ruoming Pang, Mark Allman, Mike Bennett, Jason Lee, Vern Paxson‡,, Brian Tierney "A First Look at Modern Enterprise Traffic", Usenix, Internet Measurement Conference, 2005, p. 15-28 (Year: 2005).*

(Continued)

*Primary Examiner* — Catherine Thiaw
(74) *Attorney, Agent, or Firm* — Perkins Coie LLP

(57) ABSTRACT

Introduced here are security management platforms configured to identify, assess, and monitor organizational vulnerability to security threats. By monitoring netflow data regarding the traffic traversing the Internet, a security management platform can identify security threats that would otherwise go undetected. Such action can be performed instead of, or in addition to, monitoring netflow data regarding the traffic traversing a local network (also referred to as an "internal network") associated with an organization under examination. Thus, rather than monitor the traffic leaving public-facing Internet Protocol (IP) addresses residing on the local network, the security management platform can instead monitor traffic traversing the Internet and then filter the traffic to identify flows originating from the local network, flows destined for the local network, or any combination thereof.

20 Claims, 29 Drawing Sheets

(52) U.S. Cl.
CPC ............. *H04L 43/10* (2013.01); *H04L 43/16* (2013.01); *H04L 43/50* (2013.01); *H04L 63/0227* (2013.01); *H04L 63/1408* (2013.01); *H04L 41/0213* (2013.01)

(58) Field of Classification Search
CPC ......... H04L 43/10; H04L 43/16; H04L 43/50; H04L 41/0213
See application file for complete search history.

(56) References Cited

U.S. PATENT DOCUMENTS

| | | | | |
|---|---|---|---|---|
| 8,180,916 | B1* | 5/2012 | Nucci | H04L 43/028 |
| | | | | 709/233 |
| 8,561,187 | B1 | 10/2013 | Hegli | |
| 8,595,843 | B1* | 11/2013 | McCabe | H04L 63/14 |
| | | | | 726/25 |
| 8,762,298 | B1 | 6/2014 | Ranjan et al. | |
| 8,918,883 | B1 | 12/2014 | Boyle et al. | |
| 9,356,942 | B1 | 5/2016 | Joffe | |
| 9,569,232 | B1 | 2/2017 | Brandwine et al. | |
| 2002/0072942 | A1 | 6/2002 | Kuykendall et al. | |
| 2004/0172557 | A1 | 9/2004 | Nakae et al. | |
| 2004/0177144 | A1* | 9/2004 | Yip | H04L 29/06 |
| | | | | 709/225 |
| 2006/0004719 | A1 | 1/2006 | Lawrence et al. | |
| 2008/0181217 | A1* | 7/2008 | Sheppard | H04L 45/04 |
| | | | | 370/389 |
| 2011/0138471 | A1 | 6/2011 | Van De Weyer et al. | |
| 2011/0277034 | A1* | 11/2011 | Hanson | H04L 63/1433 |
| | | | | 726/25 |
| 2012/0017262 | A1 | 1/2012 | Kapoor et al. | |
| 2013/0051248 | A1* | 2/2013 | Pei | H04L 43/0823 |
| | | | | 370/245 |
| 2013/0160119 | A1 | 6/2013 | Sartin et al. | |
| 2013/0222387 | A1* | 8/2013 | Bradshaw | G06T 11/206 |
| | | | | 345/440 |
| 2013/0347060 | A1* | 12/2013 | Hazzani | G06F 21/554 |
| | | | | 726/1 |
| 2014/0007241 | A1 | 1/2014 | Gula et al. | |
| 2014/0012982 | A1* | 1/2014 | Li | H04N 21/44222 |
| | | | | 709/224 |
| 2014/0013434 | A1* | 1/2014 | Ranum | G06F 16/903 |
| | | | | 726/24 |
| 2014/0201836 | A1 | 7/2014 | Amsler | |
| 2015/0043378 | A1 | 2/2015 | Bardgett et al. | |
| 2015/0121456 | A1 | 4/2015 | Milman et al. | |
| 2015/0326587 | A1 | 11/2015 | Vissamsetty et al. | |
| 2015/0373039 | A1 | 12/2015 | Wang | |
| 2017/0013001 | A1 | 1/2017 | Friedman et al. | |
| 2017/0171221 | A1* | 6/2017 | Ho | H04L 43/50 |

OTHER PUBLICATIONS

Warren Matthews and Les Cottrell "The PingER Project: Active Internet Performance Monitoring for the HENP Community", IEEE, 2000, pp. 2-8 (Year: 2000).*

* cited by examiner

Yes:
- Who sent it?
- To whom?
- When?
- How heavy is the envelope?
- Response cadence No:
- What's in it?
- Fedex

CORRELATION-DRIVEN THREAT ASSESSMENT AND REMEDIATION

CROSS-REFERENCE TO RELATED APPLICATIONS

This application claims priority to U.S. Provisional Application No. 62/508,298, titled "Global Internet Sensor Fusion" and filed on May 18, 2017, and U.S. Provisional Application No. 62/586,669, titled "Correlation Driven Threat Assessment and Remediation" and filed on Nov. 15, 2017, each of which is incorporated by reference herein in its entirety.

TECHNICAL FIELD

Various embodiments concern devices, computer programs, and associated computer-implemented techniques for identifying, assessing, and monitoring organizational vulnerabilities to security threats.

BACKGROUND

A computer network (also referred to as a "data network") is a digital telecommunications network that allows nodes to share resources. In a computer network, computing devices exchange data with one another via connections (also referred to as "data links"). These data links may be established over cable media, such as copper wires or fiber optic cables, or wireless media, such as Wi-Fi or Bluetooth® communication channels.

The traffic in a computer network is often analyzed to improve decision making for network operations, security techniques, etc. Traffic may be acquired from a variety of computing devices residing within the computer network to provide extensive visibility of traffic flow. Given the complexity and volume of traffic routed through many infrastructures, a variety of network tools have conventionally been used to identify, analyze, and/or handle security threats to a computer network. Examples of network tools include intrusion detection systems (IDSs) and intrusion prevention systems (IPSs).

SUMMARY

Introduced here are security management platforms configured to identify, assess, and monitor organizational vulnerability to security threats. By monitoring netflow data regarding the traffic traversing the Internet, a security management platform can identify security threats that would otherwise go undetected. Such action can be performed instead of, or in addition to, monitoring netflow data regarding the traffic traversing a local network (also referred to as an "internal network") associated with an organization under examination. Thus, rather than monitor the traffic leaving public-facing IP addresses residing on the local network, the security management platform can instead monitor traffic traversing the Internet and then filter the traffic to identify flows originating from the local network, flows destined for the local network, or any combination thereof.

When examining the flows, the security management platform can watch for various scenarios that correspond with an increased likelihood that a security threat exists. These scenarios can be referred to as "risk filters." Together, these risk filters allow the security management platform to identify which public Internet Protocol (IP) addresses on the local network of an organization (also referred to as "internal IP addresses") are vulnerable to unauthorized access, as well as which IP addresses outside the local network (also referred to as "external IP addresses") are risky for internal IP addresses to communicate with. When we refer to 'internal IP addresses' in this application, we are referring to publicly routable IP addresses that belong to a given organization or customer, not IP addresses in reserved or private ranges, such as those outlined in RFC1918 (IPv4) or RFC4193 (IPv6), that are sometimes colloquially referred to as "internal IP addresses."

Each risk filter is based on the premise that a first IP address is communicating with a second IP address. Generally, the security management platform will examine communications between internal IP addresses and external IP addresses. However, the security management platform could also examine communications between pairs of internal IP addresses and/or pairs of external IP addresses.

For a first risk filter, the security management platform can pull active sensing data to see if an external IP address has any vulnerable services running on it. Active sensing data is derived from active probing of the external IP address by the security management platform. More specifically, the security management platform may actively probe the external IP address by sending a query that is intended to elicit a response. Any responses generated in response to the query are described by the active sensing data.

For a second risk filter, the security management platform can pull active sensing data to see if a particular service has been observed running on the port associated with the external IP address. Said another way, the security management platform can generate a query intended to act as a real-time confirmation as to whether a particular service is present at the external IP address.

For a third risk filter, the security management platform can pull active sensing data to see if an internal IP address has any vulnerable services running on it. The third risk filter is similar to the first risk filter, though the focus is on the internal IP address rather than the external IP address. The security management platform can optionally generate alerts based on whether traffic appears to be inbound or outbound from the internal IP address. Outbound traffic is generally riskier because it implies that an action is being taken by the vulnerable service, thereby indicating potential compromise of the corresponding computing device.

For a fourth risk filter, the security management platform can examine historical netflow from all parts of the local network under examination. For example, the security management platform may examine histograms of flow activity to and from each internal IP address, and then generate a threshold based at least in part on the histograms. Generally, the threshold corresponds to the amount of traffic typically traversing the local network. By implementing thresholds, the security management platform can readily discover when an internal IP address is transmitting/receiving much larger traffic volumes than usual. A threshold may be automatically tuned based on other signals, such as the total traffic volume within the internal network, the number of computing devices on the internal network, the time of day, the day of week, etc.

For a fifth risk filter, the security management platform can compare the external IP address to a set of "bad" external IP addresses that are known to be risky or vulnerable. The set can come from a variety of sources, including threat intelligence that is publicly posted (e.g., by the Federal Government of the United States) or disclosed by organizations, as well as from other sources such as honeypot servers maintained by the security management platform.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
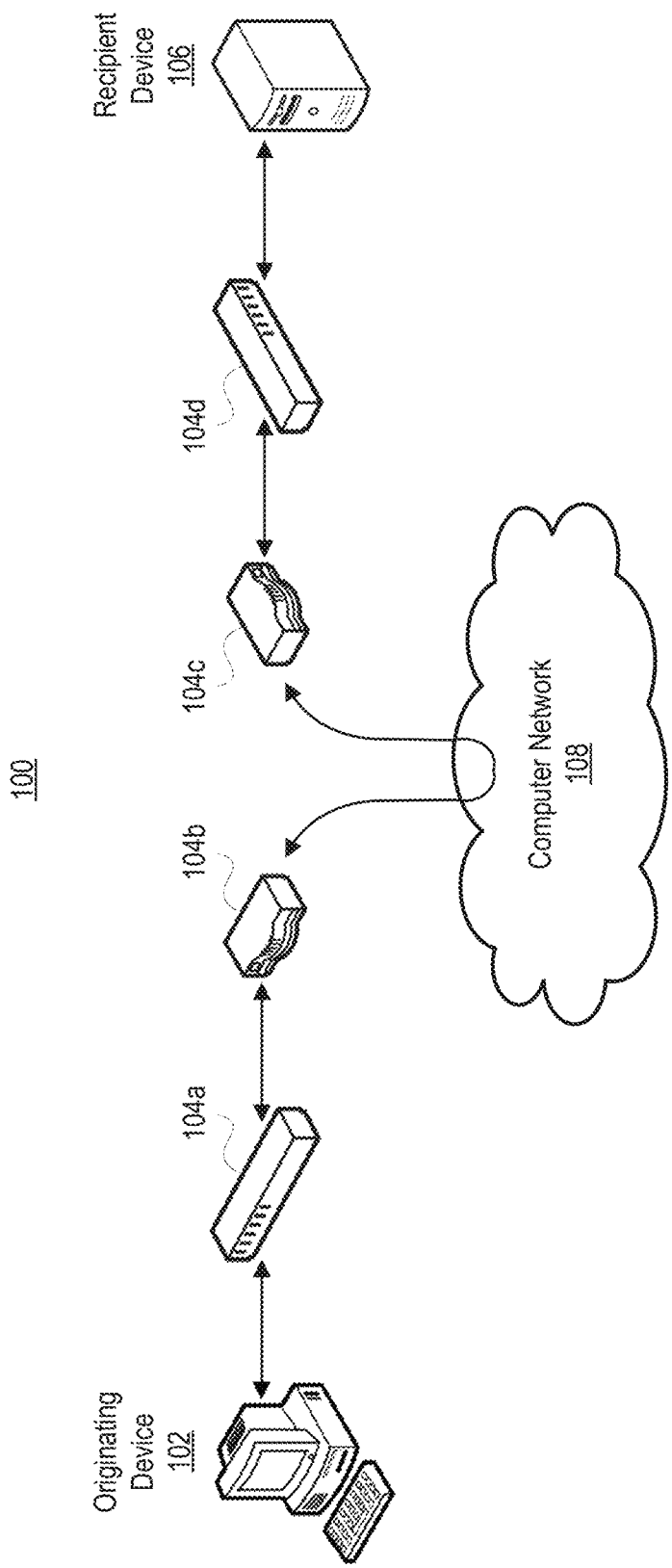
FIG. 1 depicts an example of a network arrangement in which multiple computing devices (also referred to as "nodes") communicate via a computer network.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

A computer network is a digital telecommunications network that allows computing devices to share resources. FIG. 1 depicts an example of a network arrangement 100 in which multiple computing devices (also referred to as "nodes") communicate via a computer network 108. The nodes couple an originating device 102 (e.g., a desktop computer) to a recipient device 106 (e.g., a computer server). Thus, the nodes allow data packets to be transmitted between the originating device 102 and the recipient device 106. Examples of nodes include switches (e.g., switches 104a, 104d), routers (e.g., routers 104b, 104c), etc.

Each node represents a possible entry point into the computer network 108. The entry points could be, and often are, from different points within the computer network 108.

The ability to communicate across vast distances via computer networks (e.g., the Internet) has facilitated significant changes in everyday life and commerce. For example, computing devices located in different countries can readily communicate with one another to conduct a business transaction. However, the interconnectivity facilitated by computer networks can also be used maliciously, and the ease of communicating via these computer networks can make it difficult to identify unauthorized activities performed by bad actors.

One technique for managing the threat of malicious actions involves actively monitoring traffic flows traversing a computer network. This technique may also be referred to as "netflow monitoring."

Figure 2:
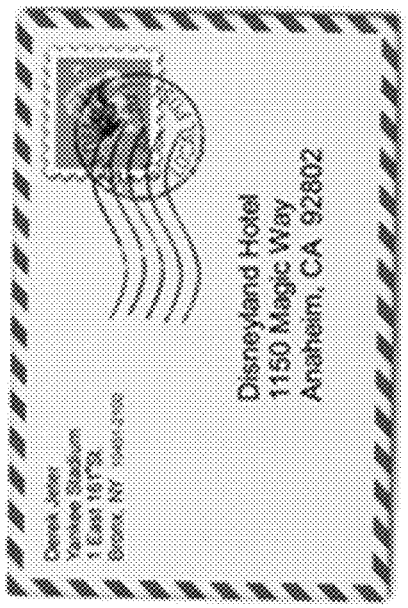
FIG. 2 illustrates the concept of netflow data through the use of a mailbox metaphor.
Figure 2:

FIG. 2 illustrates the concept of netflow data through the use of a mailbox metaphor. When an envelope is dropped in a mailbox, certain information will be apparent to the deliverer (here, United States Postal Service). For example, the deliverer will be able to readily establish who sent the envelope, who the intended recipient is, when the envelope was sent, how heavy the envelope is, the response cadence, etc. However, some information will not be apparent to the deliverer. One example of such information is the contents of the envelope. The deliverer will also be unaware of any envelopes delivered by another deliverer (e.g., FedEx, UPS, or DHL).

In the context of data packets, similar information can be derived from netflow data. For example, a mechanism that monitors netflow data can readily establish who sent a data packet (i.e., the source), who will receive the data packet (i.e., the destination), when the data packet was sent, how large the payload is, the response cadence, etc. By examining netflow data, a holistic view of traffic flows traversing a computer network can be established. For example, an administrator may be able to observe where traffic is coming from, where traffic is going to, how much traffic is being generated, etc.

Figure 3:
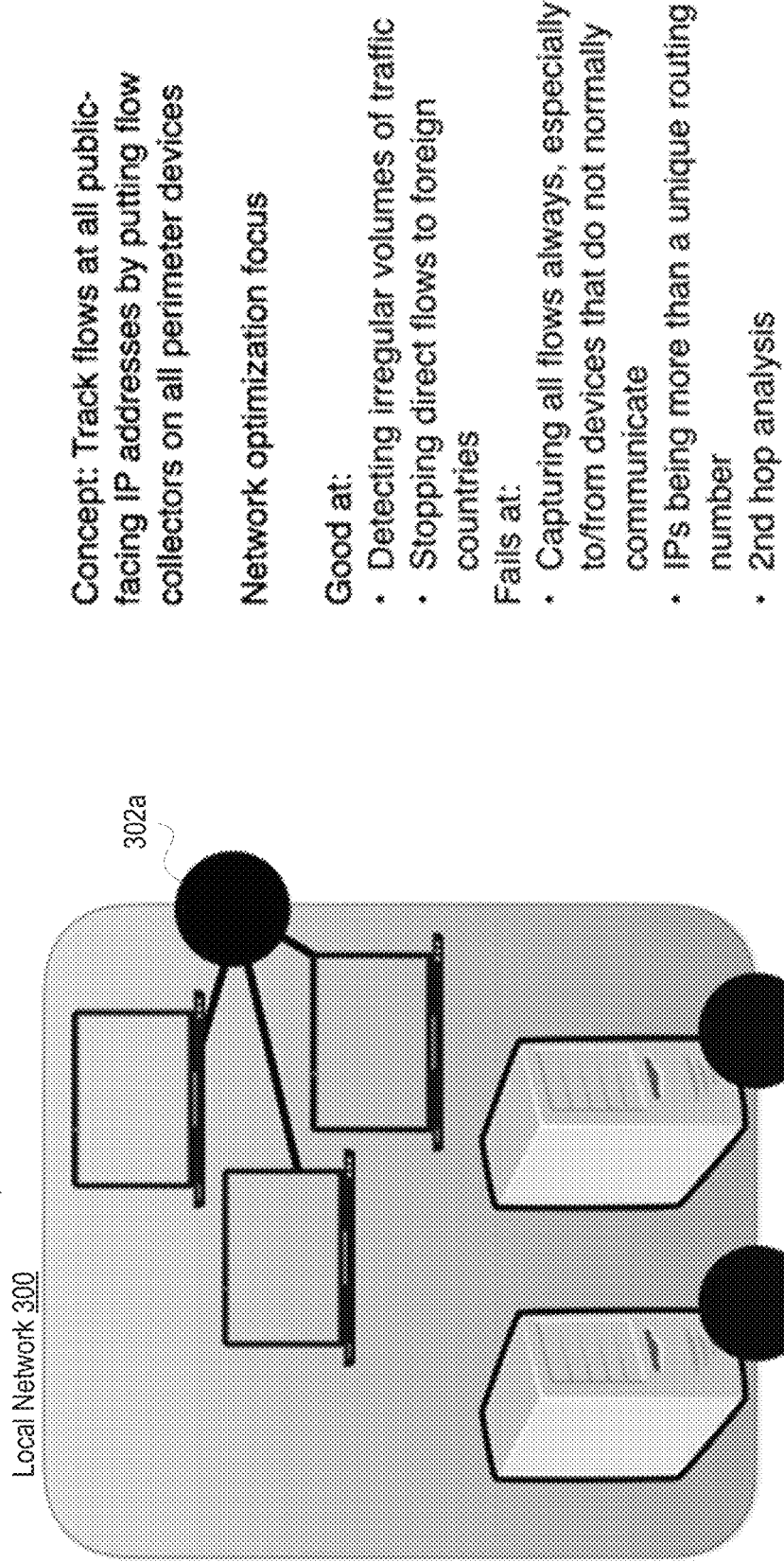
FIG. 3 is a diagrammatic representation of a local network that illustrates how organizations have conventionally used netflow data.

FIG. 3 is a diagrammatic representation of a local network 300 that illustrates how organizations have conventionally used netflow data. Generally, an organization will monitor the traffic flows at all public-facing Internet Protocol (IP) addresses the organization owns or controls by putting flow collectors on these perimeter nodes 302a-c. Such action provides several benefits. First, the flow collectors can readily detect irregular volumes of traffic through these perimeter nodes. Second, the flow collectors can readily stop traffic flows destined for certain recipients (e.g., recipients in foreign countries) before the data packets leave the local network 300.

However, these conventional solutions suffer from several drawbacks. First, flow collectors simply cannot always capture all traffic flows entering/exiting the local network 300. For example, due to cost and labor limitations, an organization will typically opt not to monitor computing devices residing within the local network 300 that do not normally communicate. As such, any data packets that go to or come from these computing devices may be missed. Second, because flow collectors only use IP addresses as a unique routing number, higher-level analysis of security threats cannot be performed. Third, flow collectors cannot perform hop analysis beyond the first connection outside of the local network 300 (also referred to as the "first hop").

Introduced here, therefore, are security management platforms configured to identify, assess, and monitor organizational vulnerability to security threats. By monitoring netflow data regarding the traffic traversing a computer network (e.g., the Internet), a security management platform can identify security threats that would otherwise go undetected. For example, a security management platform may be configured to identify security threats to a local network (also referred to as an "internal network") associated with an organization. However, rather than monitor the traffic leaving public-facing IP addresses residing within the internal network, the security management platform can instead monitor global traffic traversing the Internet and then filter the global traffic to identify traffic originating from the internal network, traffic destined for the internal network, or any combination thereof.

Some embodiments of the technology described herein concern scanners (also referred to as "scanning mechanisms") that can be deployed on one or more computer networks, as well as a repository that includes data returned by these scanner mechanisms. If a security management platform is configured to identify security threats to a local network, then a scanner can be deployed on the local network and/or the Internet. A scanner may comprise a distributed system capable of sending a wide variety of data packets to the public-facing IP addresses of a computer network under examination in an effort to provoke a response. In some embodiments the scanner sends data packets to all public-facing IP addresses of the computer network, while in other embodiments the scanner sends data packets to some public-facing IP addresses of the computer network. These data packets can be sent by the scanner in accordance with Internet Protocol version 4 (IPv4) or Internet Protocol version 6 (IPv6). IPv4 provides $2^{32}$ (approximately $4.3 \times 10^9$) addresses while IPv6 provides $2^{128}$ (approximately $3.4 \times 10^{38}$) addresses. Thus, a scanner could be configured to send all sorts of different signals to the computing device(s) that reside in the computer network under examination.

Embodiments may be described with reference to particular network configurations, protocols, networks, etc. However, those skilled in the art will recognize that these features are equally applicable to other network configurations, protocol types, network types, etc. For example, while certain embodiments may be described in the context of the Internet, the relevant feature(s) may be used in conjunction with other types of computer networks (e.g., internal networks associated with organizations).

Moreover, the technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be used to program a computing device to perform a process for collecting netflow data for a computer network, fusing the netflow data together with other information to create a holistic view of the network infrastructure, identifying vulnerabilities in the network infrastructure, assessing threats to the computer network, remediating the threats, etc.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Technology Overview

Figure 4:
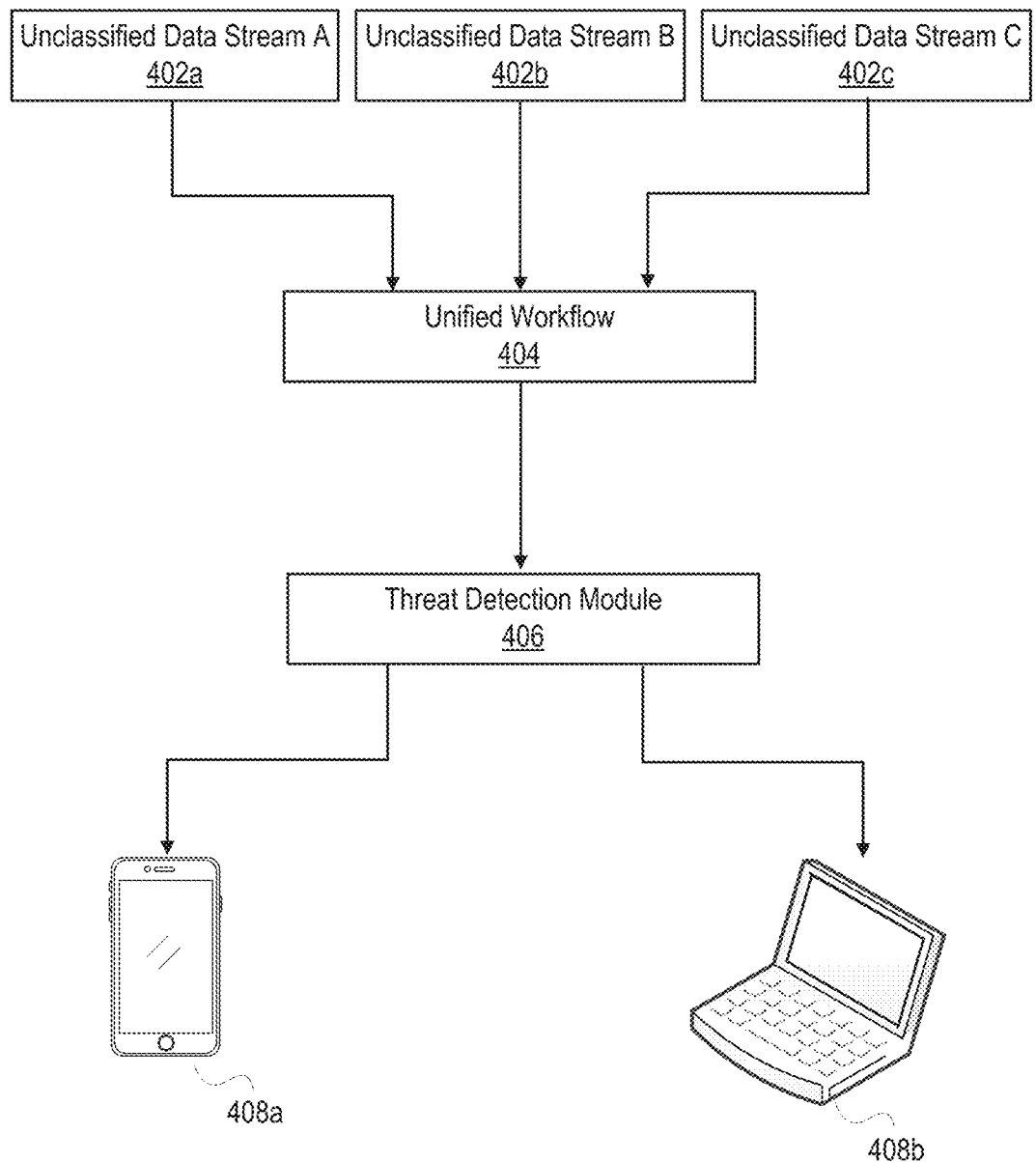
FIG. 4 illustrates how multiple data streams can be fused into a single unified workflow.

One benefit of the technology described herein is its ability to predictively identify and deny vectors of attack against the digital assets (also referred to as "cyber assets") of an organization. Data from multiple sources can be intelligently fused together to create a unified workflow. In FIG. 4, for example, three unclassified Internet-scale data streams 402a-c have been fused into a single unified workflow 404.

Thereafter, the unified workflow 404 can be acquired by a threat detection module 406. The threat detection module 406 can collect, structure, index, fuse, and present knowledge gained from the unified workflow 404 to one or more administrators associated with the organization on corresponding computing devices 408a-b. For example, outputs generated by the threat detection module 406 may be accessible to each administrator via a computer program, such as a web browser, desktop application, mobile application, or over-the-top (OTT) application. In some embodiments, the computer program is available through a software as a service (SaaS) licensing/delivery model.

The data streams 402a-c may include various types of data, including:

Network map data that can be periodically scanned and subjected to advanced data analytics. For example, network map data may be retrieved from the Internet on a daily basis, and then scanned to detect the real-time attack surface of public-facing IP addresses, computing devices, and services.

Netflow data that characterizes the packet exchange occurring between assets belonging to an organization and external IP addresses residing on the Internet. Different characteristics of the packet exchange can be examined, including the source IP address, the destination IP address, the communication times, the communication port, etc.

User agent data that may identify the class and/or version of computer programs on the network map as these computer programs make Hypertext Transfer Protocol (HTTP) or HTTP Secure (HTTPS) requests through certain Internet Service Providers (ISPs) and Content Distribution Networks (CDNs).

As noted above, one objective of the technology is to fuse data received from multiple sources into a unified workflow 404. Here, three unclassified Internet-scale data streams 402a-c are fused together. Each unclassified data stream 402a-c could correspond, for example, to network map data, netflow data, and user agent data. By examining the unified workflow 404, the threat detection module 406 can predictively identify and deny vectors of attack against cyber assets belonging to an organization.

Such an approach represents a major advance in the domain of "attacker's view" cyber analytics. Foreknowledge of likely attack vectors affecting the cyber assets of an organization can be predicated on comprehensive and continual knowledge of public-facing organization assets (e.g., the publicly available computing devices and services running on organization IP ranges, as well as specific contractor IP ranges) and the communications of those public-facing organization assets with external IP addresses, computing devices, and services residing on the Internet. More specifically, the threat detection module 406 can filter the unified workflow 404 to permit high-signal triage of known/emergent vulnerabilities of organization assets.

One or more scanners can be configured to generate/retrieve the unclassified data streams 402a-c. Together, the threat detection module 406 and the scanner(s) may be referred to as a "security management platform." As further described below, the security management platform may include other components as well. By design, the security management platform may be extensible across the entire Internet. Thus, the security management platform may be configured to continually interrogate Internet-connected computing devices and services to determine the status of each. Moreover, the security management platform can store data associated with these interrogations, and then analyze the data to monitor the status of each Internet-connected computing device and service over long periods of time (e.g., months, years, or indefinitely).

Different types of data may prove useful to the security management platform for different reasons. For example, while network map data could be used for vulnerability minimization, additional contextual knowledge may be needed to extrapolate the intent of communications and assess the vulnerabilities of assets functioning as application-layer clients behind hardened edge nodes (e.g., computer servers). Netflow data and user agent data can further enhance the security management platform's abilities in these respects, thereby accelerating cyber network defense.

By enriching network map data with netflow data and user agent data, the security management platform can provide network defenders (e.g., third-party services and administrators of organizations) with unprecedented visibility into the nature of communications between cyber assets and the outside world, rather than the content of these communications. Enhanced visibility may be used for critical functions such as identifying indicators of attack, blacklisting adversary infrastructure, forming predictive models of attacker reconnaissance, etc.

Threat Assessment and Remediation

Figure 5:
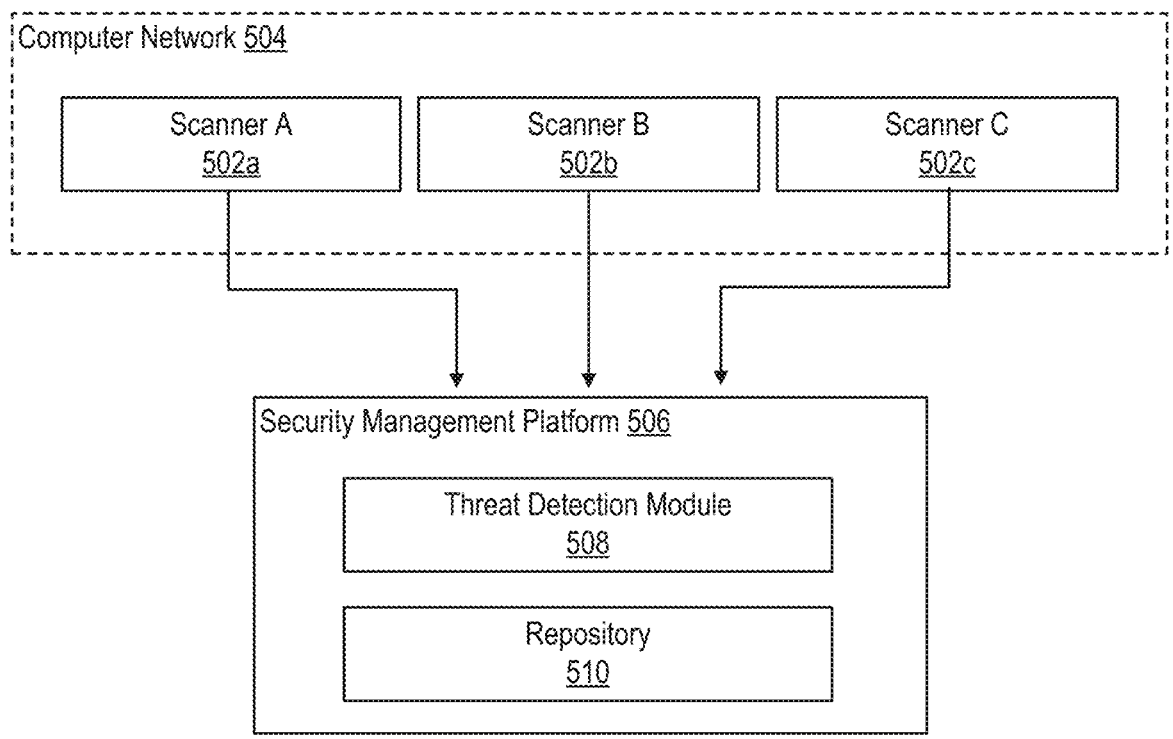
FIG. 5 illustrates a network environment that includes multiple scanners that are deployed on a computer network.

FIG. 5 illustrates a network environment 500 that includes multiple scanners 502a-c that are deployed on a computer network 504. The computer network 504 may be, for example, the Internet or a local network associated with an organization (also referred to as an "internal network").

Data received by the scanners 502a-c can be transmitted to a security management platform 506 that includes a threat detection module 508 and a repository 510. The threat detection module 508 can be configured to examine at least some of the data returned by the scanners 502a-c, while the repository 510 can be configured to store at least some of the data returned by the scanners 502a-c. The scanners 502a-c may also be considered part of the security management platform 506.

Each scanner can be configured to send a wide variety of different kinds of data packets to some or all public-facing IP addresses of the computer network 504 under examination. These data packets can be sent by a scanner in accordance with IPv4 and/or IPv6. Thus, a scanner could be configured to send all sorts of different signals to computing device(s) that reside within the computer network 504 under examination.

For computing devices that execute computer software that responds to signal(s) generated by a scanner, the security management platform 506 can record any responses that are returned. For example, the security management platform 506 may cause a scanner (e.g., Scanner A 502*a*) to send an HTTP GET request to a certain IP address that may ask whether a web page is hosted on the corresponding service and, if so, to return a copy of the main page. Embodiments of the security management platform 506 can perform such actions on a large scale. For example, the scanners 502*a*-*c* could send HTTP GET requests across the entire computer network 504 (e.g., approximately 4.3 billion times across the entire IPv4 space). These requests can be submitted using a variety of different payloads for a variety of different protocols since there are many different services that can respond to such requests.

Unlike the case with different kinds of web servers, there are a variety of services that run on computing devices around the world. Examples of these services include the File Transfer Protocol (FTP) protocol and the Secure Shell (SSH) protocol, each of which allows non HTTP and HTTPS computing devices to be indexed. There are also a whole host of enterprise systems that respond to different protocols, for example telnet, SNMP, RDP, SMB, NetBIOS, MSSQL, and MySQL.

The security management platform 506 can take information learned from any returned responses and, together with data from other sources, fuse the information together to create a view of how infrastructure on the Internet is linked to different organizations. Such action enables the security management platform to better understand the status or vulnerability of each organization based on its corresponding infrastructure. In some cases, there is a lot of nuance in detecting vulnerabilities of an infrastructure. For example, observing a login prompt over a Telnet service on a specific IP belonging to a given organization indicates a vulnerability in the infrastructure for that organization, as any user attempting to sign in to the service must send credentials in clear text, enabling a network attacker to see those credentials and use them for potentially nefarious purposes. In other cases, a vulnerability may be identified merely because the infrastructure is not designed to face the public (i.e., is not designed with security in mind), and therefore can be easily exploited. For example, some protocols for industrial control systems (e.g., BACnet or Modbus) are on the Internet that, in many cases, actually predate most of the Internet. These protocols are not designed with network security in mind. Instead, these protocols provide easy, raw access to the underlying control system without requiring any authentication. Therefore, these protocols are, by their nature in terms of the protocols themselves as well as the computer software responsible for implementation, inherently insecure if made publicly accessible on the Internet, and thus can become vulnerable to all sorts of malfeasance by bad actors.

Some embodiments of the security management platform 506 are configured to find parts of infrastructure for organizations and their digital assets. Such action allows identification of digital assets that are not only risky, but also digital assets that an organization is not aware of. Thus, the security management platform 506 can provide a unified review of traffic traversing the computer network 504 to identify all items in a certain asset category that belong to an organization, and then provide a rank order of these items based on status and/or risk in a generalized sense.

The security management platform 506 may accomplish this using primary signals that include a variety of different public registration databases, as well as analytics and/or public signals available on the Internet. In some embodiments, the security management platform 506 includes a control module (not shown) that supports a visibility product (also referred to as a "visibility service"). The visibility product can tell an organization things that it doesn't know with regard to vulnerabilities, alert the organization in real time as these vulnerabilities are discovered, etc.

The process by which these vulnerabilities are corrected is also important. Some embodiments of the security management platform 506 include connectors (not shown) that close a control loop to provide faster responses and near real-time value delivery if there is something in an organization's local network that is a risk, such as a virus, corrupted file, or raw access point. Generally, these connectors close the control loop automatically or near automatically. However, these connectors may also be configured to only close the control loop upon receiving manual input from an administrator. The administrator may be associated with the organization or a third-party security service responsible for managing the security management platform 506. Accordingly, embodiments of the security management platform 506 can concern improving visibility into a computer network and addressing how actions can be taken to control discovered vulnerabilities. For example, if a vulnerability is automatically discovered in a computing device that resides on a local network, a policy may say that the computing device should be shut down.

Consider an organization that has digital assets (e.g., certificates and domain names) sitting on IP addresses that reside on an organization network. This may be referred to as the organization's network boundary. Because the security management platform 506 can see the entire Internet, the security management platform 506 can associate each digital asset with each external digital asset out on the Internet that is somehow associated with the organization.

Such action enables the security management platform 506 to generate a holistic picture of the organization's digital assets from the outside looking in. This picture often encompasses items that the organization never knew about. For example, digital assets may enter the organization's network boundary that the organization is completely unaware of and/or that are not under the organization's control. Digital assets may also leave the organization's network boundary because of some action performed by the organization. By monitoring digital assets associated with the organization, changes in the network boundary can be readily identified. Changes that have a particular consequence for the organization may be flagged in some manner (e.g., an alert may be posted to an interface for review by an administrator). Moreover, changes may drive a feedback loop that causes some remediation action (whose occurrence may be verified) to be performed. The remediation action may cause the organization's network boundary to shrink or otherwise be improved in some way.

Thus, embodiments of the security management platform 506 can not only see the organization's network boundary, but also what is moving through the organization's network boundary by combining knowledge derived from databases of network traffic information with knowledge regarding the owners of the source, destination, and/or path that the network traffic takes. These observations of network traffic passing through a given organization's network boundary can be called "flux." The network boundary may be defined in such a manner to give the organization information about how the network boundary changes, as well as to see the flux through the network boundary. The security management platform 506 may also associate the flux with consequences (e.g., the flux is talking to a command-and-control system of a botnet, the flux is talking to some computing device within the network boundary that shouldn't be communicating, etc.).

In some embodiments, the security management platform 506 cooperates via partnerships with Internet service providers (ISPs) and other network service providers that record data/metadata regarding what is passing over their services. Additionally or alternatively, the security management platform 506 may partner with organizations that record data/metadata regarding what is passing across their monitored network boundary. Accordingly, the security management platform 506 may observe IP addresses that are "talking" to other IP addresses. The security management platform 506 may also receive information such as the ports and protocols these IP addresses are using, whether communication is occurring in accordance with Transmission Control Protocol (TCP) or User Datagram Protocol (UDP), whether the communication is a virtual private network (VPN) transaction using a protocol such as Internet Protocol security (IPSec), etc. Accordingly, a massive amount of data may be received by the security management platform 506 (e.g., on the order of about a petabyte per day). Because it is typically too expensive to process all of this data, the security management platform 506 can intelligently determine which data to process so that security-related actions are more relevant.

In some embodiments, the security management platform 506 defines network boundaries for certain organizations (e.g., current and/or prospective customers of a security service facilitated by the security management platform 506). In such embodiments, the security management platform 506 can draw down netflow and query the netflow for different time ranges (e.g., the last week, month, etc.). Such action enables the security management platform 506 to understand who these IP addresses are talking to, and then correlate those IP addresses with what the security management platform 506 already knows about them. Because the security management platform 506 is not instrumented only to on the perimeter of the network but rather the global internet, analysis isn't limited to a single hop, unlike conventional netflow security products. Moreover, the security management platform 506 can not only see traffic that is coming in and out of an internal network associated with an organization, but also traffic between IP addresses for which neither are part of the organization's network.

As a result, if traffic is routed through one or more proxy nodes, the security management platform 506 can follow the traffic past those proxy node(s) to identify the actual source. For example, if IP address 1.1.1.1 (owned by an organization) talks to IP address 2.2.2.2 and then IP address 2.2.2.2 talks to IP address 3.3.3.3, the security management platform 506 may infer that these two separate communications were actually a single communication between IP address 1.1.1.1 and IP address 3.3.3.3, even though no direct communication occurred between these nodes, and no system looking only at traffic from the organizations network boundary could infer the connection with 3.3.3.3. Said another way, the security management platform 506 may infer that IP address 2.2.2.2 was simply acting as a proxy (also referred to as a "routing conduit"). In some embodiments, the security management platform 506 is configured to perform such analysis to detect any number of hops between any number of intermediate routing conduits (e.g., if IP address 3.3.3.3 talks to IP address 4.4.4.4, IP address 4.4.4.4 talks to IP address 5.5.5.5, and so on). Thus, the security management platform 506 can observe more than conventional netflow security products by performing "n"-hop analysis.

The technology introduced here can be designed to correlate information about the services running on IP addresses with information about the nature/behavior of activities and communications between IP addresses. For example, a security management platform 506 can collect different types of data on the Internet, regardless of whether it is at the IP address level, certificate level, or domain name level. For IP addresses in particular, the security management platform 506 can collect quite a bit of information that can subsequently be associated with the appropriate IP address(es). For example, the security management platform 506 may query an IP address to discover what service(s) are running on the corresponding computing device and on what port(s) those service(s) are available. Moreover, the security management platform 506 may discover what service(s) used to be running on the computing device and on what port(s) those service(s) were available. Often, the security management platform 506 will also have a sense of who owns and/or is responsible for managing an IP address under review. In general, the security management platform 506 can use its sense of how IP addresses are used on the Internet for routing to a unique address much like an individual could send an envelope via the post office.

The security management platform 506 can then evaluate the risk of a communication entering or exiting an internal network based on which internal IP address is involved (i.e., who the communication is talking to on the internal network), as well as which external IP address is involved (i.e., who the communication is talking to on an external network, such as the Internet). For example, the security management platform 506 may determine whether the external IP address looks particularly vulnerable to takeover, is running a vulnerable service, appears to have a good way for a bad actor to take over for use as a proxy to talk to the internal network, etc.

One example of a correlation is when an internal IP address (also referred to as an "organization IP address" or a "customer IP address") is communicating with an external IP address on which there is a critically vulnerable service running. Items such as Telnet, MySQL, self-signed certifications on an HTTPS service, etc., allow the security management platform 506 to get a sense of not only which external IP address(es) an internal IP address is talking to, but also why these external IP address(es) might be at risk. The security management platform 506 may also determine why the external IP address(es) might be vulnerable to use as a proxy in an attack against an internal network that includes the internal IP address.

The security management platform 506 can also do interesting things with new or ephemeral services. These are services are defined as those that are recently stood up at a given IP address, and stood up for a short period of time. An example would be an SSH server present on IP 2.2.2.2 for only 6 hours on one day, and never seen again at that IP. These services are of interest as there is rarely a legitimate use for such services to be communicating with a network, and malicious actors frequently stand up attack infrastructure on previously unused IPs to conducts attacks on networks by evading blacklists. these services, the security management platform 506 can observe that an IP address residing on a network is talking to IP address 1.2.3.4. In this case, assume that the communication with external IP address 1.2.3.4 is on port 80, though it could be any port with a standard protocol. If the security management platform 506 observes an incoming communication on port 80 from external IP address 1.2.3.4 and an outgoing response when no service is determined to be running on port 80 from information derived from active scans of the network, the security management platform 506 may classify this as alarming behavior. The security management platform 506 may also have an excellent infrastructure that is very hard to block, so the security management platform 506 can confidently infer that if no service is determined to be running based on the active scans, that service is in fact not running on the network under consideration (e.g., an internal network or the Internet).

When the security management platform 506 sees a service responding on a given port on a given IP address outside of the network that wasn't there during the last scan (e.g., from the previous day or week), then the security management platform 506 may associate the service with a potentially bad actor. For example, the potentially bad actor may have stood up the service for a malicious reason (e.g., to gain unauthorized access to digital assets in the network). The potentially malicious actor may have also stood up the service for a limited timeframe (e.g., an hour). However, if the security management platform 506 scans the network under consideration at a consistent frequency (e.g., every 2 hours, 6 hours, 12 hours, or 24 hours), then the security management platform 506 is likely to detect potential threats before any harm is caused by them. While the security management platform 506 may not immediately catch all potential threats, the security management platform 506 will typically detect when new or ephemeral services are stood up with significant success. Moreover, if a potentially bad actor tries to be clever by standing an ephemeral service up quickly and then taking it down for an attack, the security management platform 506 can see these communications and alert the appropriate individual(s).

A third correlation looks at the services running on the IP address belonging to the organization involved in a communication with an external IP address. If there is something that the security management platform 506 has alerted on in the past at an internal IP address that is high risk (e.g., an exposed database service or industrial control system protocol), communicating with an external IP address is an extremely high-risk behavior. In such instances, the security management platform 506 may prompt an individual associated with the network (e.g., a network administrator) to determine whether the internal IP address should be accessible on the network. Moreover, if the security management platform 506 sees the internal IP address talking to the outside world (i.e., to one or more external IP addresses residing outside the network), the security management platform 506 can alert the individual.

A fourth correlation doesn't necessary correlate active sensing data with global netflow data. Instead, the security management platform 506 can take advantage of the fact that even when organizations believe they are perfectly instrumented with collecting flows off their corresponding internal networks, there seem to be things that the security management platform 506 is able to observe that these organizations cannot. The security management platform 506 is often able to see the most alarming flows, such as instances where large data packets are being sent back and forth in a manner indicative of data exfiltration. In theory, these organizations think that they have flow collectors instrumented on these internal IP addresses. However, some organizations' IP addresses are consistently missed or not put in properly to their enterprise network monitoring systems. The security management platform 506 can see these flows when it examines communications traversing the Internet rather than instruments flow collector(s) along the perimeter of an organization's internal network. For this correlation, the security management platform 506 can look for internal IP addresses that have been silent for an extended duration (e.g., several days, weeks, or months). If an internal IP address goes from silent to communicating with an external IP address, the security management platform 506 can generate an alert that indicates the organization's IP address should undergo additional examination. Generally, such action is not reported to the Internet. There is also a high probability that no instrumentation exists on the internal IP address because the organization may not have been expecting it to communicate. Thus, when the internal IP address does begin outward communication, the security management platform 506 can alert an individual associated with the organization so that appropriate action can be taken if the organization is aware that such communication is occurring. Such communication can be indicative of an unauthorized entity attempting to evade security measures implemented by the organization.

A fifth correlation can look for multiple-hop communication patterns between a list of "bad" external IP addresses (e.g., those corresponding to known malware command-and-control servers) and internal IP addresses. Bad external IP addresses can be derived from a variety of public and private sources. Internal IP addresses, meanwhile, are those IP addresses that reside within a network under consideration. Generally, the network under consideration will be an enterprise network or set of enterprise networks that is associated with an organization. However, the security management platform 506 could also examine IP addresses accessible on the Internet, in which case the security management platform 506 may analyze communications between pairs of IP addresses. Given a list of bad external IP addresses, the security management platform 506 can look for other external IP addresses that are in direct communication with these bad external IP addresses. These other external IP addresses can be referred to as "Set P." The security management platform 506 can then look for communications between internal IP addresses and Set P. If any communications are discovered, the security management platform 506 can generate an alert. Next, the security management platform 506 can look for any IP address that has communicated with both an intermediary IP address in Set P and an internal IP address. Any discovered flows involving these intermediary IP addresses can be flagged for further review because these intermediary IP addresses could be acting as proxies for an attack initiated by an IP address in Set P. Such a technique can be readily extended to multiple hops.

Each correlation can be done on a per-flow basis. Therefore, given a flow from an internal IP address to an external IP address, the security management platform 506 can discover whether any of these correlations exist.

Many of the actions represented by the aforementioned correlations are indicative of either malicious attacks on an organization's network or data exfiltration attempts. One thing that may be an indicator of data exfiltration attempts is the size of the data packets involved in a communication. In general, the larger the data packets, the higher the risk that the communication is part of a data exfiltration attempt. The security management platform 506 may also discover that medium-sized data packets are being sent to multiple IP addresses that are owned by the same entity. Thus, when the total payload is aggregated, the collective data conveyed by the data packets is massive. Because the security management platform 506 is able to access and/or derive information about the owner of each IP address involved in a communication, the security management platform 506 can monitor both possibilities.

Some embodiments of the security management platform 506 are configured for botnet tracking and/or dynamic blacklisting. A botnet is a string of Internet-connected computing devices, each of which is running one or more bots configured to collectively perform a task. For example, botnets are often used to perform distributed denial-of-service (DDoS) attacks, steal data, send spam, and allow unauthorized entities to access a targeted computing device and its network connection. In some embodiments, the five correlations described above are set up to be responsive rather than proactive. However, the security management platform 506 could also examine these risk filters as data is received from organizations (also referred to as "customers"). If a particular risk is nearly always considered bad, then the security management platform 506 may begin to be proactive with respect to the particular risk. For example, the security management platform 506 may push an appropriate instrument to the firewall on the perimeter of a network under consideration that prevents transmission of a certain type of traffic responsive to a determination that the certain type of traffic represents a significant risk to the network.

Some embodiments of the security management platform 506 are configured to approach dynamic blacklisting by tracking botnets through global netflow. The term "global netflow" generally refers to all traffic flows traversing the Internet. This can be done on an IP address level or another level (e.g., a port level). For example, the security management platform 506 may, in real time, monitor kinetic control nodes and their communication with bots to discover which bots are part of which botnets. These mappings can be made available to organizations so that if an organization begins to see a large influx of traffic from any of these bots, the organization can shut down the appropriate IP addresses before other IP addresses are hit. For example, thousands of bots may be part of a botnet, and five of these bots may start to send heavy amounts of traffic as part of a DDoS attack on an organization's internal network. At that point, the security management platform 506 may preemptively blacklist the other 995 bots, which could also send large volumes of traffic as part of the DDoS attack if the responsible entity rotates which hosts are responsible for sending traffic.

Figure 6:
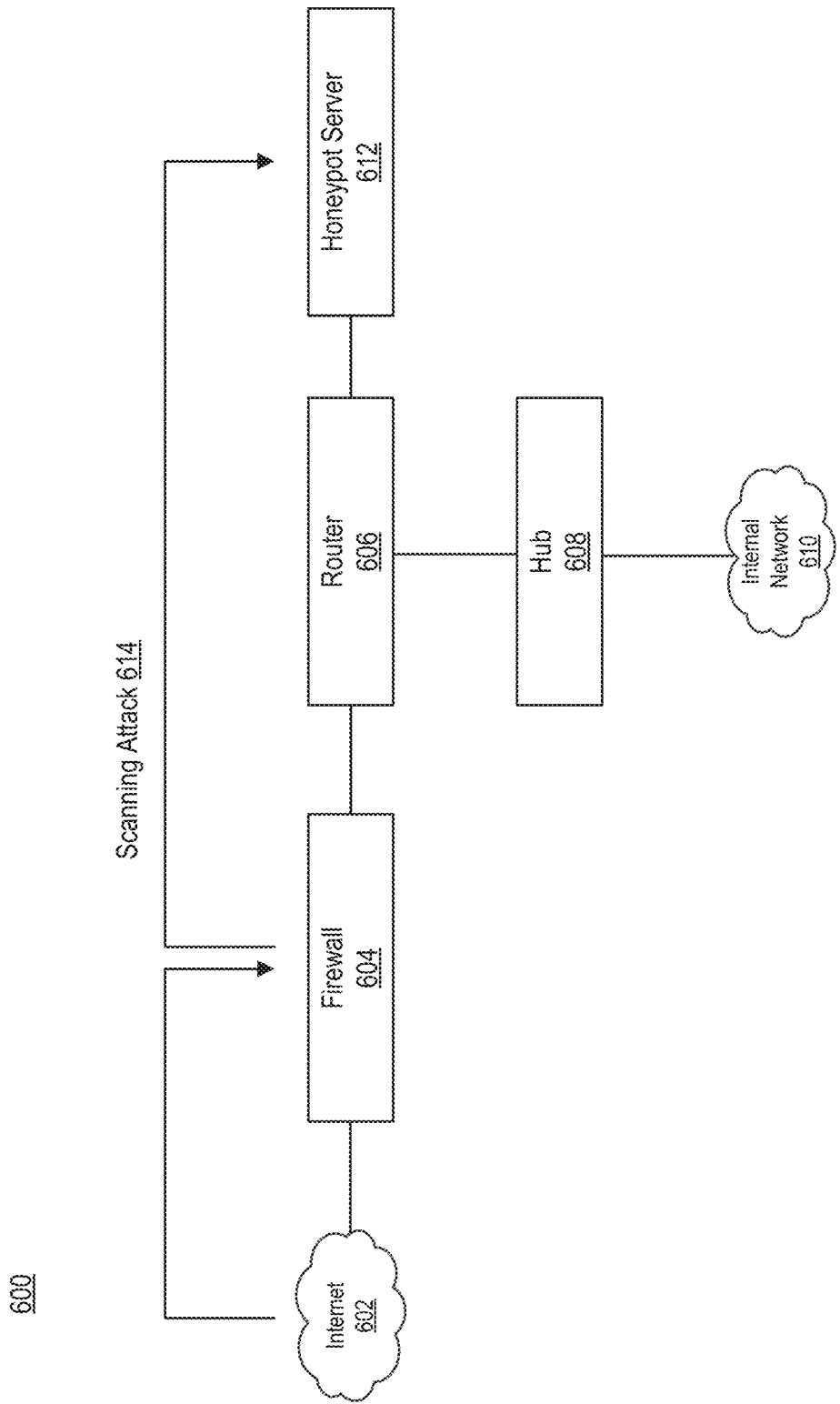
FIG. 6 illustrates a network environment that includes a honeypot server that may be employed as part of a security management platform designed to protect an internal network.

FIG. 6 illustrates a network environment 600 that includes a honeypot server 612 that may be employed as part of a security management platform designed to protect an internal network 610. A honeypot server 612 (also referred to as a "honeypot") is a security mechanism set to detect, deflect, or, in some manner, counteract attempts at unauthorized use of information systems residing on the internal network 610. Generally, the honeypot server 612 includes data that appears to be a legitimate part of the internal network 610 that contains information/resources of value to attackers, but the honeypot server 612 is actually isolated and monitored so that attackers can be blocked.

More specifically, an attacker may attempt to breach an organization's network 610 by communicating with an internal IP address via an external IP address that resides elsewhere on the Internet 602. Communications are generally received by a firewall 604, which represents the outer perimeter of the organization network 610. The firewall 604 can be communicatively coupled to a router 606, which may be communicatively coupled to the honeypot server 612 and a hub 608 connected to the internal network 610. The firewall 604 can be configured to deflect an incoming scanning attack 614 to the honeypot server 612. Such action prevents the scanning attack 614 from breaching the organization network 610 and discovering digital assets of value.

Botnets tend to scan for vulnerable IP addresses. Accordingly, the security management platforms described herein may periodically perform random scans throughout the Internet. In such embodiments, honeypot servers can be placed on IP addresses throughout the Internet, and the security management platform can simply wait for individuals to scan these IP addresses by pulling netflow off the IP addresses. Said another way, the security management platform may parse global netflow to identify traffic involving the IP addresses corresponding to the honeypot servers. These IP addresses may belong to organizations that knowingly agree to such action, as well as entities (e.g., third-party security services) that the organizations interact with. Often, the security management platform is looking for a sense of similarity where it can find commands coming from command-and-control infrastructure to the object responsible for scanning at least one IP address associated with a honeypot server. Example inquiries include discovering who instructed the botnet to scan the at least one IP address, when the scan occurred, who else the botnet is talking to, etc. When a bot scans a honeypot server, the security management platform can immediately pull netflow corresponding to the bot (e.g., by identifying Internet communications involving the IP address of the bot).

Such action allows the security management platform to see every other object the bot is talking to. The vast majority of these objects are usually other IP addresses that are being scanned.

The security management platform may try to find those key communications between a bot and a command-and-control center, which could correspond to a single IP address or multiple IP addresses. The command-and-control center will often be distributed. The security management platform can discover these characteristics of a botnet, as well as validate which computing device(s) the botnet is talking to at any given point in time. While some noise must be consistently removed, the security management platform can look for patterns of similarity between the way these potential new bots are scanning IP addresses associated with an organization and the way confirmed bots previously scanned these and other IP addresses. Several different pattern features can be examined, including the timing of scans, the external port(s) being scanned, what is being scanned, how these bots are behaving, etc. Any sort of similarity may increase confidence that a botnet (and, in some cases, a known botnet) is responsible.

By tracking communications over time, the security management platform can monitor which bot(s) are communicating with the command-and-control infrastructure. This allows the security management platform to build a dynamic blacklist of bots that are associated with the command-and-control infrastructure. More specifically, the security management platform can maintain a list of command-and-control nodes and/or a list of bots. These lists may be associated with different confidence levels (e.g., the security management platform may have high confidence in the accuracy of the list of command-and-control nodes and lower confidence in the accuracy of the list of bots). Thus, for all IP addresses owned by one or more organizations, the security management platform can find interceptions for every command-and-control infrastructure being monitored. The organization(s) may represent some or all of the organizations whose internal networks are being monitored by the security management platform. If the security management platform discovers that an external IP address associated with a command-and-control node and an IP address associated with an organization are communicating with the same object, the security management platform may alert the organization.

There are also other ways to acquire IP addresses that are associated with command-and-control centers. One key feature present in some embodiments is integration, where there are other lists that have been populated by individuals who have indicated that an IP address might be associated with a command-and-control center but the IP address does not usually talk to internal networks directly. Rather, the IP address may communicate with an organization's network through one or more compromised hosts. Attackers will typically be completely unaware that the security management platform has this type of visibility into communications. As a result, if the security management platform has a list of IP addresses associated with a command-and-control center, the security management platform can readily determine if an organization is talking to object that is likely compromised and is itself communicating with an attacker. The security management platform can also chain multiple instances together for a higher-order analysis of communications (e.g., of second hop, third hop, etc.).

Some embodiments of the security management platform also include a risk filter. For example, the Federal Government of the United States recently released a list of Hidden Cobra IP addresses that are associated with North Korea. All of these IP addresses can be put into a risk filter. Then, if the security management platform sees an organization talking to an external IP address on the list, the security management platform can estimate a sense of risk with the external IP address. The security management platform may alert the organization if the sense of risk exceeds a certain threshold.

In a botnet attack, a command-and-control center generally relays orders to multiple bots that specify how these bots should scan IP address(es) of interest. For example, the command-and-control center may order a first bot and a second bot to scan a given IP address at some future point in time. The first and second bots may remain silent until then. Before these bots attack (e.g., via some sort of denial-of-service (DoS) attack), the commend-and-control center sends instructions to each bot indicating that it is time to attack. By looking at communications between the command-and-control center and the multiple bots, the security management platform can observe different elements of this approach. For example, the security management platform may detect that an external IP address will be part of an attack before the attack actually occurs and automatically blacklist the external IP address.

Some remediation actions may be manually performed. For example, an individual (e.g., a network administrator) may manually cause certificates on an internal network to be upgraded. Some actions performed by the security management platform may be manually prompted while others are automatically initiated (e.g., a provisioning module may periodically update infrastructure by distributing certificates across an organization's network). For example, an object could be reimaged if the flow directed to/from the corresponding IP address was suspicious. As another example, a local network could be segmented from the Internet based on risk. Similarly, a subset of a local network could be segmented from other parts of the local based on risk.

The risk of an IP address could also be pushed organization-wide across a firewall to make sure that no computing devices managed by the organization are able to communicate with the IP address. In some embodiments, a log of IP address(es) associated with high risk is maintained by the security management platform. Some of these actions can be facilitated by an automation orchestration framework that works with the security management platform to address threats across an entire organization.

Part of the feedback loop employed by the security management platform could be implemented via a ticketing system. The ticketing system can be configured to generate an action ticket that is picked up and used by the security management platform to improve future actions. Alternatively, the action ticket may spawn some other action that ultimately results in feedback indicating that the original action is closed. Thus, these action tickets could be used to validate, for example, that a change actually occurred. Some embodiments of the security management platform also provide continuous monitoring on an ongoing basis and generate alerts upon observing a progression in consistent changes. Some remedial actions might be entirely internal (i.e., performed only on the IP addresses and/or computing devices residing on an organization's network). Some remedial actions might involve interactions with other organizations (e.g., when a domain name is changed, an IP address is updated, etc.). Said another way, some remedial actions may require that the security management platform interact with a third party or facilitate an interaction between an organization and a third party. Thereafter, the security management platform can validate the feedback loop.

Accordingly, the first step may be for a security management platform to identify vulnerabilities in an internal network. Then, once the vulnerabilities have been identified, the security management platform can take the action(s) necessary to remediate these threats. Any number of actions could be performed. For example, the security management platform may automatically generate a blacklist by capturing a log of risky IP addresses. The blacklist could then be applied in accordance with a specific policy inside the organization. Thus, the security management platform may observe communications in real time, and these observations can drive the creation and/or augmentation of a blacklist.

In general, the security management platform will send out a signal to one or more IP addresses. The security management platform can then examine any responses that are received from these IP address(es). Each response will typically include data and metadata that allows the security management platform to infer information about the source (e.g., the corresponding computing device), computer software running on the source, organizational associations, vulnerabilities, and/or misconfigurations. This information can then be fused together with additional data to gain a better understanding of the communications involving these IP address(es).

In conventional flow analysis, a security product would monitor netflow across the perimeter of an internal network associated with an organization and draw simple conclusions regarding security of the organization. For example, if data packets were transmitted to an IP address located in China or Russia, then a security product is likely to determine that a high security risk exists. However, such action is not enough to discover more advanced security threats. By focusing on the features and/or conduct of IP addresses involved in communication, a security management platform can address the drawbacks of conventional security products. More specifically, the security management platforms described herein can examine large amounts of fine-grain details regarding communications traversing a network (e.g., a local network or the Internet), and then perform remediation action(s), as necessary, in real time as security threats are identified. The security management platform can also fuse data from different sources together in a manner that allows corrective actions to be more rapidly taken (e.g., before the security threat matures into an issue).

In some embodiments, the security management platform can discover the assets (e.g., IP addresses) belonging to an organization across the entire Internet. After these assets have been identified, the security management platform can look for flows emanating from (or directed to) the assets on the boundary on a network associated with the organization. Said another way, the security management platform can examine traffic entering the Internet from the organization's network, or vice versa, even if the network has not been explicitly instrumented by the organization, and even if the organization itself was not aware or tracking that network in their other enterprise systems. The security management platform may do this by actively scanning IP addresses accessible on the Internet. In some embodiments, the security management platform also has access to information that allows it to join these communications (e.g., by sending signals to the IP addresses and parsing responses received in return).

Referring again to FIG. 2, if a security entity would like to know which envelopes to inspect at a post office, it is difficult to arrive at such a determination with only an address. However, the determination can be made much easier if the security entity knows who sent the envelope (i.e., the sender), who will receive the envelope (i.e., the recipient), whether an organization is associated with the address, etc. This information allows the security entity to gain a better sense of who is shipping what to whom. Similarly, the security management platform can examine the IP address at which a communication is received, as well as additional information about any other IP addresses involved in the exchange of data packets. As noted above, the security management platform can also establish the bounds of an internal network with high confidence.

If an organization receives an envelope that misses the inspection process (e.g., by being dropped off somewhere other than the mailroom), the organization may be completely unaware that the envelope exists. However, the post office will know that the envelope exists because the post office is responsible for conveying the envelope from its source to its destination. The security management platform can act in a similar fashion with respect to communications traversing the Internet. In general, most organizations use instruments on IP addresses along the perimeter of their internal networks. Such a design is good at several things, including detecting irregular volumes of traffic and stopping direct flows to certain locations (e.g., foreign countries). However, this design will often miss some communications. Because the security management platform observes traffic on the Internet, the security management platform is able to see all communications to/from an organization, regardless of whether the organization is aware of these communications.

In determining whether it is risky for an internal IP address to communicate with an external IP address, the security management platform can consider three items: (1) details on flow; (2) details on the internal IP address; and (3) details on the external IP address. If the security management platform determines that communication poses a risk to the internal network on which the internal IP address resides, then the security management platform can communicate the risk to the organization associated with organization network. The communication may provide context regarding the internal IP address and/or external IP address, a sense of appropriate remediation action(s), etc.

Information regarding the internal IP address and/or the external IP address can be derived by a global scanning infrastructure that includes one or more scanners (e.g., scanners 502*a-c* of FIG. 5). The global scanning infrastructure can examine the type of computing device corresponding to each IP address, who the computing device belongs to, other risk factors, etc. For example, if the security management platform discovers that the internal IP address corresponds to a Telnet computer server, then the security management platform can enrich the corresponding information by specifying that the internal IP address should not be publicly exposed on the Internet. Such action may be referred to as "tagging" data to specify additional details that are useful in determining risk. Some of these additional details can be discerned by simply knowing the internal IP address. The security management platform can integrate these additional details with information gleaned by active scans and other databases, and then apply analytics to determine how strong the association is in a statistical sense.

As noted above, organizations may occasionally be unable to see all of their flows. Surfacing this information enables these organizations to make decisions regarding what action(s), if any, should be performed based on which flows represent the greatest risks. Historical data (e.g., data examined over the last several months or years) for a given internal network or a given IP address could also be used to determine whether the frequency of security risks is increasing/decreasing, whether security risks are affecting the same IP addresses or different IP addresses, etc.

Risk Filters

In terms of the five risk filters described above, each risk filter requires that a first IP address be communicating with a second IP address. Generally, this occurs in the form of an internal IP address that is communicating with an external IP address. In general, internal IP addresses are those IP addresses residing within the boundary of an organization network associated with an organization, while external IP addresses are those IP addresses residing outside of the boundary of the internal network. Rather than examine flows traversing an internal network, the security management platform can filter global netflow (e.g., all Internet traffic) down to flows that involve internal IP addresses. That is, the security management platform can filter the global network down to flows that have an internal IP address as either the source or destination.

For the first risk filter, the security management platform can pull active sensing data to see if the external IP address has any exceptionally vulnerable services running on it. This can include a set of insecure-by-design protocols, as well as easily and/or commonly exploited services. Examples of vulnerable services include:

Industrial control systems such as BACNet, Modbus, DNS3, Vxworks, Niagara Fox, and EthernetIP;

Database services such as MSSQL, MySQL, Postgres, Redis, and MongoDB;

Audio/video (A/V) protocols such as Session Initiated Protocol (SIP) and Real Time Streaming Protocol (RTSP);

Network protocols such as Telnet, NetBIOS, Simple Network Management Protocol (SNMP), Virtual Network Computing (VNC), Remote Desktop Protocol (RDP), and Server Message Block (SMB); and Old web server protocols such as File Transfer Protocol (FTP) and Secure Shell (SSH), as well as computing devices with default web server configurations from a variety of manufacturers.

For the second risk filter, the security management platform can pull active sensing data to see if an active service or an open port has been observed running on the port associated with the external IP address of a given flow record. The second risk filter may be tunable, with a parameter specifying how far into the past the security management platform looks (e.g., 1 hour, 1 day, 6 days, 2 months, etc.) for services that have responded to active sensing. The security management platform can optionally determine to perform an active scan of the external IP address on the corresponding port found in the flow record to get a higher assurance. Said another way, the security management platform can send a signal intended to provoke a response to the external IP address as a real-time confirmation as to whether a service is present at the external IP address.

For the third risk filter, the security management platform can take the same set of vulnerable services as described above with respect to the first risk filter and apply these to the internal IP address of the flow record rather than the external IP address. The security management platform can optionally generate alerts based on whether traffic appears to be inbound or outbound from the internal IP address. Outbound traffic is generally riskier because it implies that an action is being taken by the vulnerable service, thereby indicating potential compromise of the corresponding computing device. The security management platform can also generate alerts based on whether communication appears to be bidirectional (e.g., the security management platform can check for the presence of an acknowledgment (ACK) in the case of TCP, or multiple bidirectional flow records in the case of UDP). Bidirectional communication is generally riskier than unidirectional communication where the security management platform only observes synchronize messages (SYNs).

For the fourth risk filter, the security management platform can examine historical netflow from all parts of an organization's network. For example, the security management platform can look at a variety of histograms of flow activity to and from each internal IP address and block of internal IP addresses (e.g., those corresponding to certain divisions within the organization). The security management platform may have tunable triggers for data volume and communication frequency, among other features. These tunable triggers allow the security management platform to readily set thresholds that allow organizations to be alerted if, for example, a block including 24 internal IP addresses has had no communications for the past 30 days and then suddenly begins sending 50 megabytes (MB) of outbound traffic per day. In some embodiments, thresholds are fixed. For example, a threshold may be manually set at 25 MB, 50 MB, 100 MB, etc. In other embodiments, thresholds are variable. For example, a threshold may be configured to automatically tune itself over time based on other signals, such as the total traffic volume within the internal network, the number of computing devices on the internal network, the time of day, the day of week, etc.

For the fifth risk filter, Set P of known "bad" external IP addresses can come from a variety of sources, including threat intelligence that is publicly posted (e.g., by the Federal Government of the United States) or disclosed by organizations, as well as from other sources such as honeypot servers maintained by the security management platform. Once Set P is known, the security management platform can filter global netflow and generate alerts for those flow records corresponding to communications directly between these "bad" external IP addresses and internal IP addresses belonging to an organization under examination. The security management platform may also filter global netflow and generate alerts for those external IP addresses that communicate with both "bad" external IP addresses and internal IP addresses. In some embodiments, Set P is associated with a specific time window (e.g., those external IP addresses in the set may only be deemed "bad" for a certain period of time). Those skilled in the art will recognize that "bad" external IP addresses may not necessarily be associated with botnets. Moreover, the "bad" external IP addresses may be organization-specific. For example, for a financial company based in the United States, the "bad" external IP addresses could include any IP addresses associated with foreign corporations designated by the Office of Foreign Assets Control (OFAC). As another example, for computing devices operated by the Federal Government of the United States, the "bad" external IP addresses could include any IP addresses associated with Kaspersky Labs. Thus, Set P could vary on a per-organization bases.

Each of these risk filters can use netflow regardless of its source. For example, in some embodiments netflow is received directly from ISPs, while in other embodiments netflow is received directly from the organizations themselves. For example, netflow may include traffic collected by flow collector(s) arranged along the perimeter of an internal network by the organization. The technology can operate the same even if organizations provide their own flows in addition to flows provided by the ISPs. In such embodiments, the security management platform can simply treat the excess traffic as additional netflow to be considered (e.g., the security management platform may not assign a higher priority to flows from a particular source).

Figure 7:
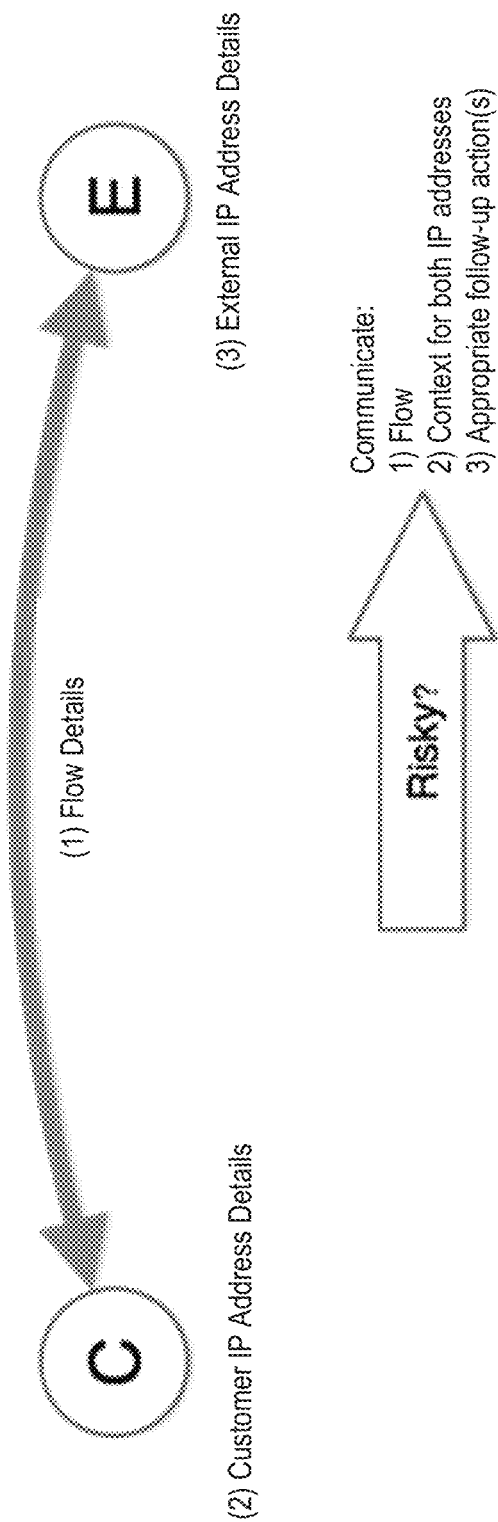
FIG. 7 illustrates how risk filters can be applied to communications between an internal IP address (also referred to as a "customer IP address" or an "organization IP address") and an external IP address.

As shown in FIG. 7, each risk filter can be applied to communications between an internal IP address (also referred to as a "customer IP address" or an "organization IP address") and an external IP address. Here, the internal IP address is depicted as a "C" endpoint while the external IP address is depicted as an "E" endpoint.

Details regarding the flow between these endpoints is typically derived from global netflow (e.g., by collecting, filtering, and examining traffic on the Internet). These details could also be derived from flow coming off the internal network associated with an organization on which the internal IP address resides. As noted above, a security management platform will typically reside outside of the organization network to gain a better understanding of all flows related to the organization. However, to gain a complete picture of risk, the security management platform may examine all flows related to the organization that traverse the internal network. In such embodiments, the security management platform can compare flows detected in the global netflow to flows detected in the netflow through the perimeter of the organization network.

Because the security management platform scans global netflow, the security management platform may also have details regarding the destinations of communications leaving the organization network (e.g., leaving each internal IP address) and the objects residing outside of the internal network. For example, the security management platform may discover the presence of these via an active sensing procedure in which a signal is directed to each object with the intent of provoking a response from which information about the corresponding object can be learned. Accordingly, the security management platform can understand whether the internal IP address is communicating with an external IP address, what type of computing device is associated with the external IP address, whether the external IP address is associated with a malicious entity, etc.

There are generally two different sources of information that may be of interest inside an organization under review:
Flow information that specifies details regarding the actual target inside the organization; and
Provisioning information that specifies what type of computing device (e.g., desktop computer, computer server, payment processing system, etc.) is responsible for communicating via the internal IP address.

Organizations are often particularly interested in being alerted to flows involving an internal IP address that is part of their demilitarized zone (DMZ), and thus represents a vulnerable point in the internal network. In security, a DMZ is a physical or logical subnetwork that contains/exposes an organization's external-facing services to an untrusted network, such as the Internet. Internal network architecture typically cannot be understood from global netflow because it sits behind a firewall. However, an organization will often be aware of the most vulnerable points in its internal network, so the organization may work with the security management platform to identify whether any of the internal IP addresses at risk fall within the DMZ.

One benefit of the security management platforms described herein is their ability to go from a reactive threat strategy to a proactive threat strategy, or vice versa. For example, a security management platform may notify an organization that a threat exists even through the organization previously discounted the risk because it did not have full information regarding the threat. Because the security management platform can observe both internal and external IP addresses, the security management platform can recommend that the organization inspect those internal IP addresses that may be used to gain unauthorized entry into the internal network.

The security management platform may also determine whether any patterns exist by examining the results of analyzing a single internal network corresponding to a single organization or multiple internal networks corresponding to multiple organizations. If the security management platform discovers a pattern where a feature (e.g., presence of a certain vulnerable service, communication with a certain external IP address, etc.) corresponds to a high level of risk, then the security management platform may opt to proactively perform the appropriate remediation action(s) when seeing the feature in the future. Rather than reactively inspecting communications, the security management platform can proactively defend organization networks against known risks.

Figure 8:
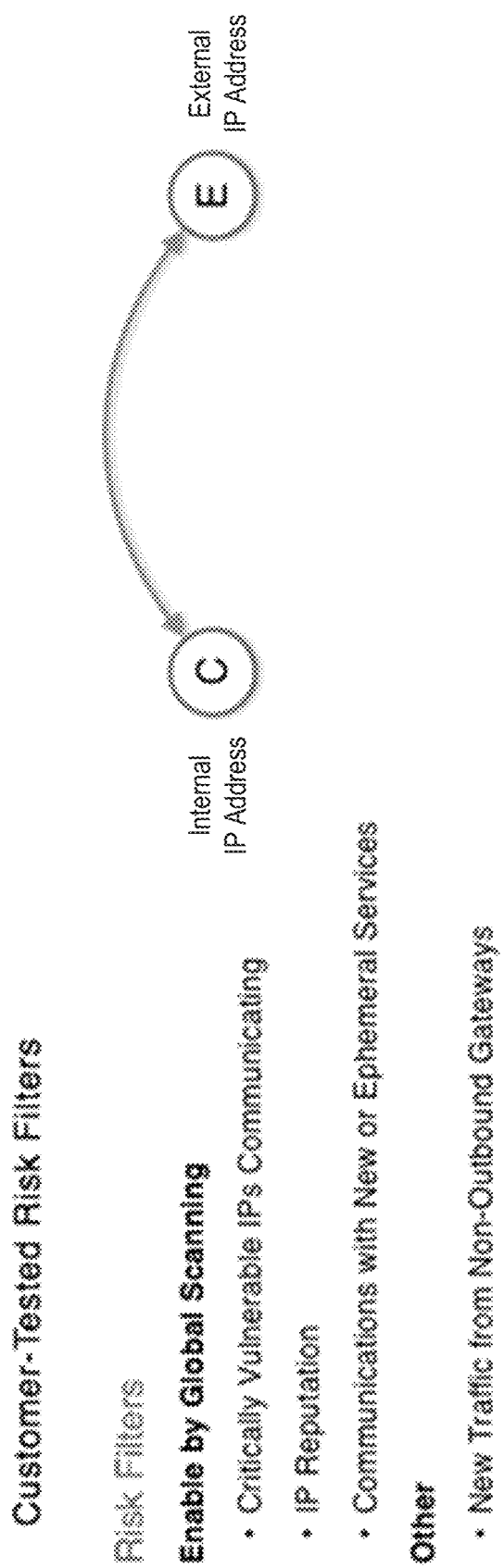
FIG. 8 depicts several different types of risk filters: (1) communications with critically vulnerable IP addresses; (2) communications with IP addresses having a known bad reputation; (3) communications with new or ephemeral services; and (4) new traffic from non-outbound gateways.

FIG. 8 depicts several different types of risk filters: (1) communications with critically vulnerable IP addresses; (2) communications with IP addresses having a known bad reputation; (3) communications with new or ephemeral services; and (4) new traffic from non-outbound gateways. Those skilled in the art will recognize that any number of these risk filters could be used by the security management platform when inspecting an internal network.

Figure 9:
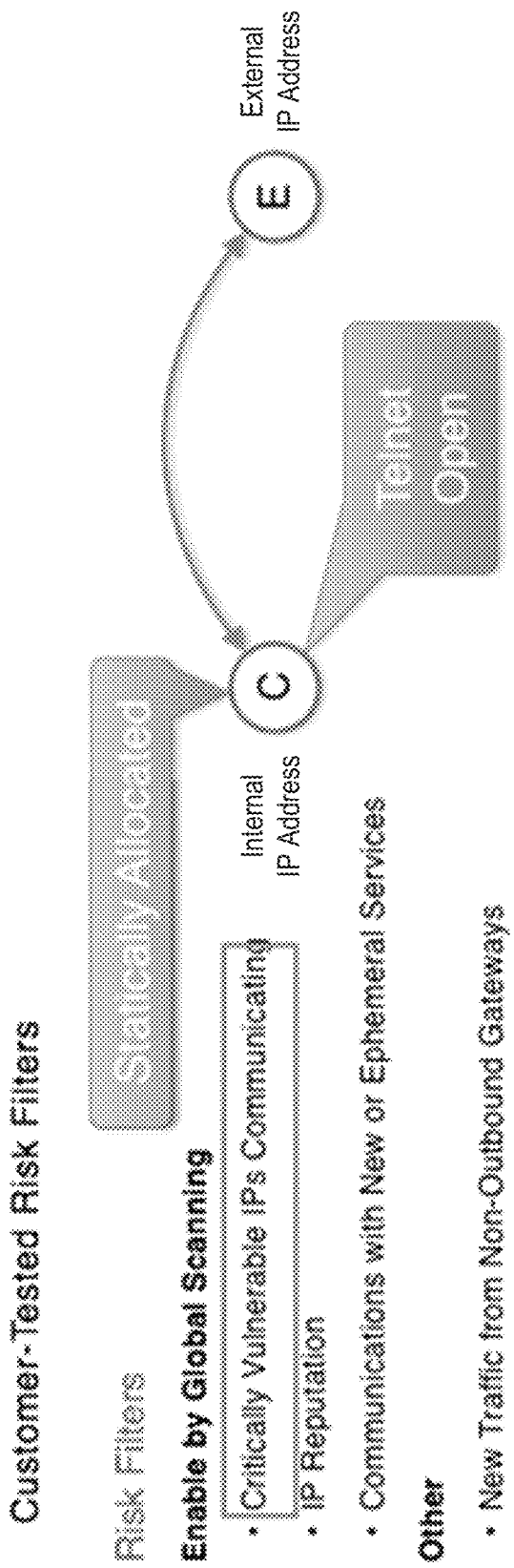
FIG. 9 illustrates a scenario in which an external IP address is communicating with an internal IP address running a critically vulnerable service (e.g., Telnet).
Figure 10:
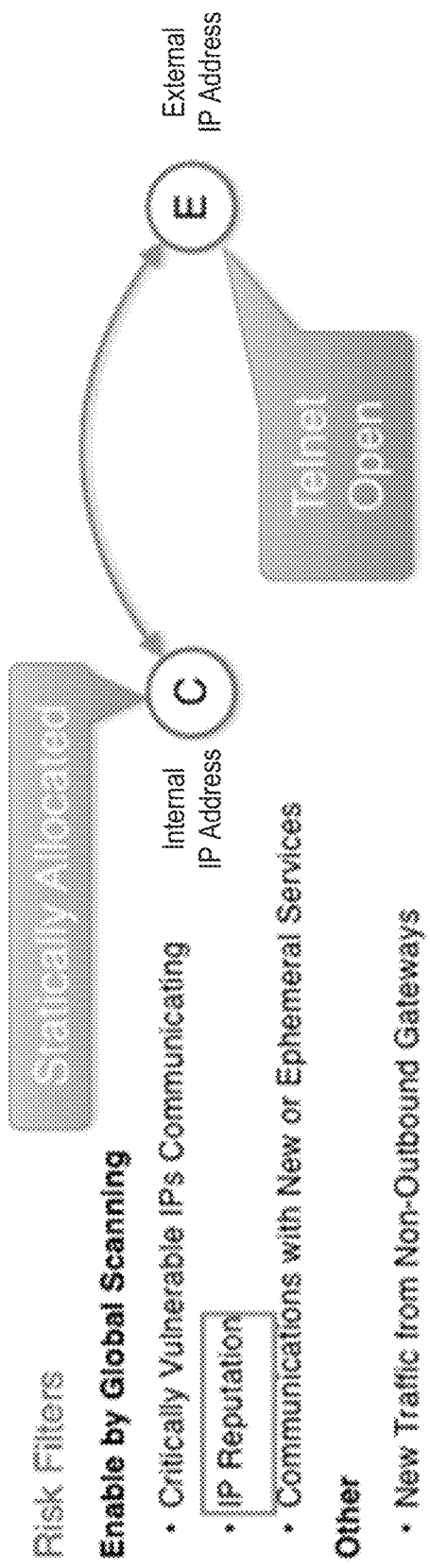
FIG. 10 illustrates a scenario in which an internal IP address is communicating with an external IP address having a known reputation.
Figure 11:
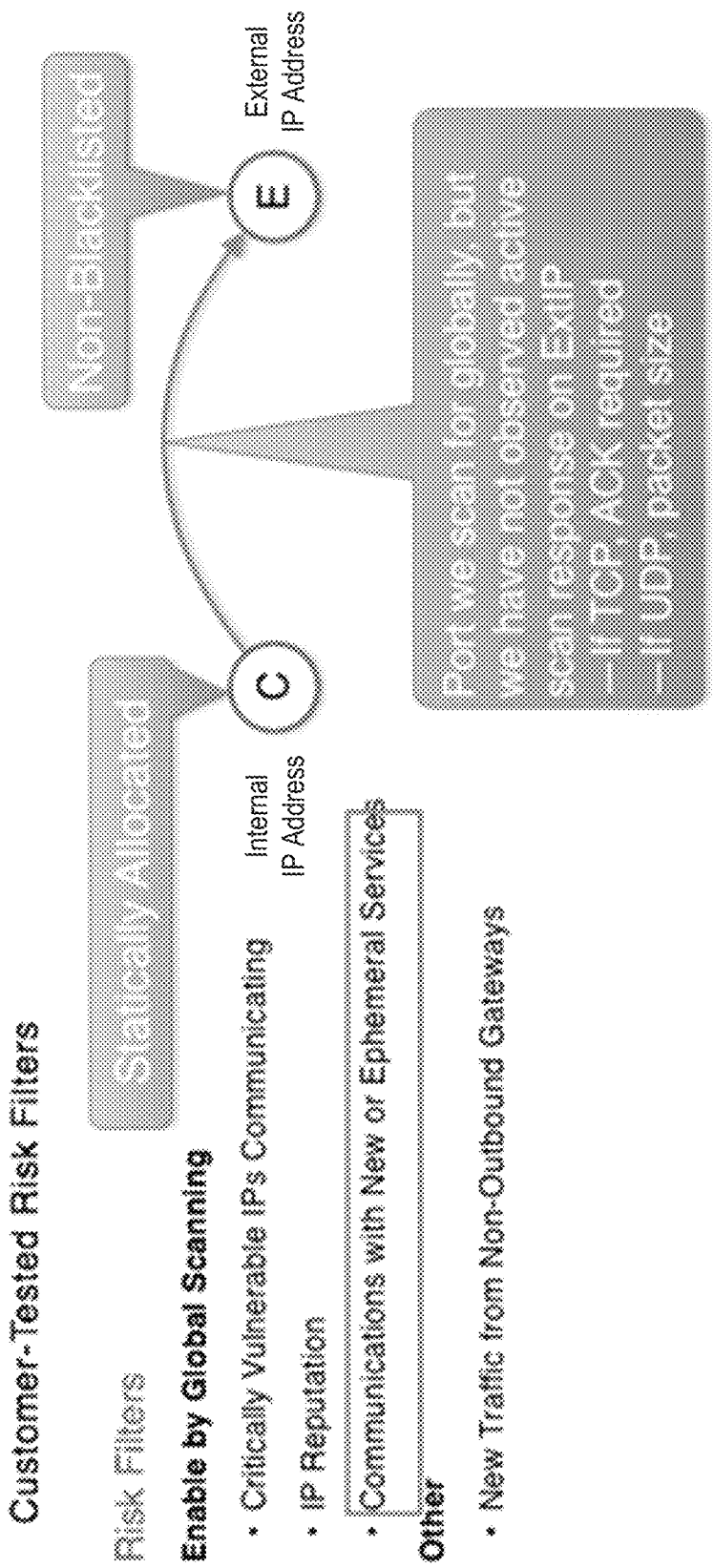
FIG. 11 illustrates a scenario in which an internal IP address is communicating with an external IP address that is running a new or ephemeral service but has not been blacklisted.
Figure 12:
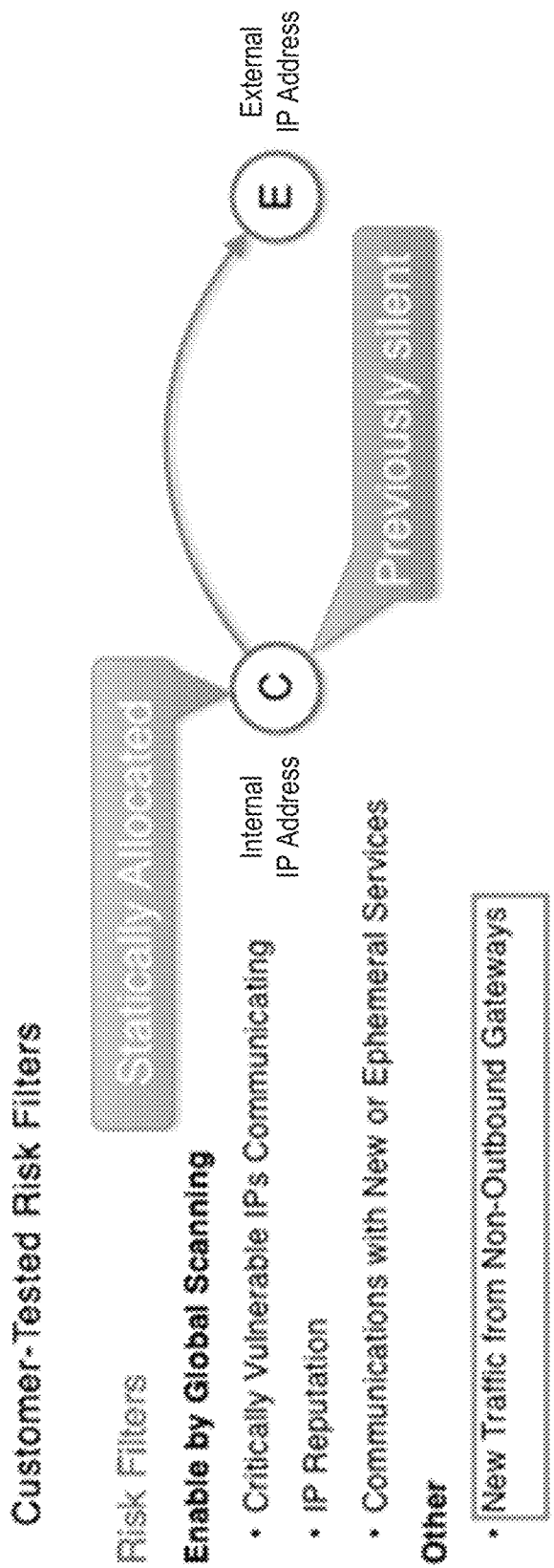
FIG. 12 illustrates a scenario in which an internal IP address that was previously silent for an extended duration (e.g., several days, weeks, or months) has begun communicating with an external IP address.

FIGS. 9-12 depict examples of these different types of risk filters. FIG. 9 illustrates a scenario in which an external IP address is communicating with an internal IP address running a critically vulnerable service (e.g., Telnet). FIG. 10 illustrates a scenario in which an internal IP address is communicating with an external IP address having a known reputation. Here, for example, the external IP address has a reputation of being high risk because it is running a critically vulnerable service (e.g., Telnet) that heightens the risk the external IP address will be used as a proxy. FIG. 11 illustrates a scenario in which an internal IP address is communicating with an external IP address that is running a new or ephemeral service but has not been blacklisted. In such scenarios, the security management platform may actively scan the external IP address and examine what response(s), if any, are returned. For example, the security management platform may determine whether an ACK is received in the case of TCP, or may examine data packet size in the case of UDP. FIG. 12 illustrates a scenario in which an internal IP address that was previously silent for an extended duration (e.g., several days, weeks, or months) has begun communicating with an external IP address. This security management platform may generate an alert intended to ensure that the organization is aware the internal IP address has begun communicating, thereby prompting performance of any necessary remediation action(s) (e.g., taking the computing device corresponding to the internal IP address offline).

User Agent-Based Threat Correlation

By working with an organization, a security management platform can identify the endpoints (e.g., desktop computers and computer servers) that persistently reside on an internal network. Moreover, by examining global netflow, the security management platform can identify the endpoints (e.g., mobile phones and laptop computers) that temporarily reside on the internal network. To gain a better understanding of the internal network as a whole, the security management platform must be able to monitor persistent endpoints and non-persistent endpoints.

In some embodiments, the security management platform is configured to identify the types of endpoints that are on the internal network. Such action can be performed outside the internal network without having to instrument any endpoints on site. Instead, the security management platform can do this using user agents. Each user agent can include one or more scanners (e.g., scanners 502a-c of FIG. 5) configured to communicate with endpoints. When an endpoint makes a Web request, the endpoint will provide information to the intended recipient of the Web request. This information can specify, for example, what type of endpoint is involved, what sort of data is involved, what service(s) are running on the endpoint, what type of hardware is included in the endpoint, etc. This information is generally provided so that content returned by the intended recipient is appropriately sized, formatted, etc. While user agents are instrumented outside of the internal network, the user agents can determine characteristic(s) of endpoints on the internal network by examining communications originating from or directed to these endpoints. For example, a user agent could determine what types of user-facing computer software are running on the internal network.

Different actions may be taken based on what is discovered with respect to the endpoints on the internal network. For example, the security management platform may discover that an endpoint is running the Windows XP® operating system. In such a scenario, the security management platform can identify the operating system as no longer supported or allowed by organization policy. Similarly, the security management platform can look for outdated computing devices. Many organizations disallow particular types of computing devices (e.g., those made in China) because they have been known to exfiltrate information. By examining the information learned by user agent(s), the security management platform can see which endpoints, if any, are not complying with organization policies. Moreover, the security management platform can observe flows off the internal network to see if any endpoints are leaking proprietary information to external IP addresses, generating signals that make it possible for external IP addresses to target the endpoints in return, etc.

For example, an endpoint on the organization network may have a script that betrays information about items of interest, such as how directory structures are set up. If the security management platform discovers that the script exists, then the security management platform can determine that the endpoint is likely to be targeted by an unauthorized entity (also referred to as an "outside entity"). In some embodiments, the outside entity provides a payload that causes the endpoint to run in an undesired manner. For example, the payload may prompt the endpoint to direct communications to an unintended recipient. The security management platform can also look for malware or check for audits (e.g., by examining whether updates have occurred on schedule as expected and/or in accordance with organization policies).

The security management platform may also monitor endpoints over time. For example, the security management platform can see where endpoints have been in the past, predict where endpoints will be in the future, etc. Such action can be used to facilitate compliance with organization policies. For example, the security management platform may identify endpoints that have violated geographical restriction policies (e.g., some organizations may not allow mobile phones or laptop computers to be brought into certain countries). Thus, the security management platform can monitor whether endpoints associated with an organization are at risk, as well as whether the endpoints have complied with organization policies.

As more organizations suffer breaches, the security management platform can track how exposed an organization was during a breach. This can be accomplished by examining the traffic that flowed into and out of the organization network corresponding to the organization before, during, and/or after the breach. The security management platform may have access to the traffic even if it is encrypted while flowing over the boundary of the organization network. Additionally or alternatively, the security management platform may receive unencrypted traffic from ISPs.

In some embodiments, the security management platform acquires data regarding traffic from multiple sources. For example, the security management platform may acquire encrypted traffic from scanner(s) instrumented along the boundary of an internal network, unencrypted traffic from ISPs, and/or unencrypted traffic from CDNs configured to decrypt communications addressed to them. One benefit of such an approach is that the security management platform can identify what type of endpoints are on the organization network that are not otherwise managed. Generally, the security management platform is less likely to see nonpersistent endpoints on a consistent basis, though abnormal communication activities can still be discovered. For example, a laptop computer may not be persistently on the organization network when it is turned on/off, moved between different locations, etc. However, the security management platform could still detect abnormal communication activities (e.g., if the laptop computer begins sending large amounts of data at 3:00 AM when it normally doesn't operate).

Communication activities represented by netflow can also be examined to determine what an endpoint is, what computer software is running on an endpoint, etc. Some endpoints may actually specify certain characteristics about themselves in outgoing communications. For example, the security management platform may discover an outdated endpoint that is running the Windows® NT 2000 operating system if there is traffic coming from the outdated endpoint. If traffic is coming from the outdated endpoint, then the outdated endpoint is connected to the open Internet (and thus open to attack by an unauthorized entity).

While multiple endpoints will often reside within the perimeter of an organization network, these endpoints may randomly communicate with external objects that reside outside of the organization network. This is referred to as the "network boundary concept." If an endpoint is called by an external IP address or visits a malicious website (e.g., a phishing website), the endpoint will not be protected because it is making an outbound connection. Endpoints within the organization network can still be within a boundary of interest because these endpoints are capable of calling external objects. However, the focus may still be on what these endpoints are, rather than what they're doing, because their only conduct is calling external objects, some of which the security management platform may have instrumented. The security management platform may also look at the different kinds of commands produced by these endpoints (e.g., instructions such as PUT for sending data and GET for receiving data).

Some embodiments of the security management platform are configured to monitor the content of data packets included in communication activities. For example, an HTTP GET request can include a header (also referred to as the "user-agent header") in which it is highly recommended to include a description of the source. Several different standards exist that specify what kind of information should be included in the header. For example, the header may specify what kind of browser is running on an endpoint, whether a mobile application generated the data packet, etc. Often, the header will include information about the underlying hardware of the endpoint and/or what operating system is running on the endpoint.

Some embodiments of the security management platform provide context to streams of information based on its knowledge of objects distributed throughout the entire Internet. A security management platform can add tremendous value by providing more details and context about how objects (e.g., internal or external IP addresses) are communicating, as well as how these objects relate to an organization and the organization's network. By gaining a better understanding of these communication activities, the security management platform can deliver more value of consequence to the organization. For example, the security management platform can indicate how communication activities related to the organization have changed over time (e.g., in volume, which internal IP addresses are involved, which external IP addresses are involved, etc.). As another example, the security management platform can discover when an endpoint that was previously unrelated to the organization has joined the organization's network.

The security management platform can also examine datasets that help in the creation of a map of organizations' network boundaries. These datasets may be created by organizationally unique user agents that are instrumented in previously unidentified IP address space. In some embodiments, these datasets are used to associate blocks of IP addresses with corresponding organization(s). Similarly, if there is a preponderance of flows between two blocks versus other blocks using a protocol such as VPN, IPSec, Generic Routing Encapsulation (GRE), etc., then the security management platform may infer that these two blocks belong to the same organization.

Objects observed by the security management platform could also be pulled into different correlations and actions. Said another way, the security management platform can observe a series of objects and then, based on these observations, take appropriate action(s). For example, if the security management platform discovers an outdated endpoint running obsolete or unsupported computer software, the security management platform can alert the corresponding organization that action should be taken to address the security risk. Generally, an individual associated with the organization (e.g., an administrator working on site) will have to find the outdated endpoint and perform the appropriate action(s) (e.g., retire or update the outdated endpoint).

Actions may be based primarily on visibility. For example, if an endpoint is manufactured by a company that is included in an approved security baseline, the security management platform may generate an alert and/or create a ticket indicating that the endpoint is a low security threat. The actions could also be based primarily on control. For example, if an endpoint executing an out-of-date version of the Microsoft Windows® operating system is discovered on a given subnetwork, the security management platform may push an alert to an automatic provisioning system that causes the endpoint to be upgraded, scheduled for maintenance, etc. Alternatively, the automatic provisioning system may cause the given subnetwork (e.g., an internal local area network (LAN)) to be temporarily segmented from other networks as a proactive, preventative measure.

As noted above, the security management platform may be configured to infer, from data generated by user agents, what version of an operating system is running on an endpoint, what kind of computer software is installed on the endpoint (e.g., based on the software update agent for different installed computer software), and the version of installed computer software. From this information, the distribution of computer software and different versions can be inferred across an organization, as can the difference (also referred to as the "delta") between internal network reality and what baseline policies/mandates stipulate. The security management platform may issue an alert if a discrepancy is discovered. For example, an alert could be generated upon discovering that the number of outdated versions of certain computer program exceeds a threshold.

In general, the security management platform focuses on generating alerts for certain categories of information. Examples of these categories include:

Out-of-date computer software (e.g., how many instances of the Windows XP® operating system are still present on an internal network, how many instances of Internet Explorer® 6 are still present on an internal network that are at risk of easy exploitation by a watering hole attack, etc.);

Vulnerable or banned computing devices (e.g., Chinese-manufactured computing devices made by Huawei Technologies Co., ZTE Corporation, and Xiaomi Inc. are banned from internal networks related to the Federal Government of the United States and many companies);

Vulnerable computer software (e.g., many mobile applications are known to beacon information about the mobile phones on which they are installed in violation of corporate data policies);

Malware beacons (e.g., known user agent signatures can be compared against known malware samples given by a threat intelligence feed or derived through a reverse engineering effort to determine whether any matches exist); and Uniquely identified communications (e.g., are there user agent strings present on an internal network that are unique to the corresponding organization and could these user agent strings be used by an unauthorized entity to identify connections that the internal services are making with the Internet).

Risk Filter Reports

Figure 13:
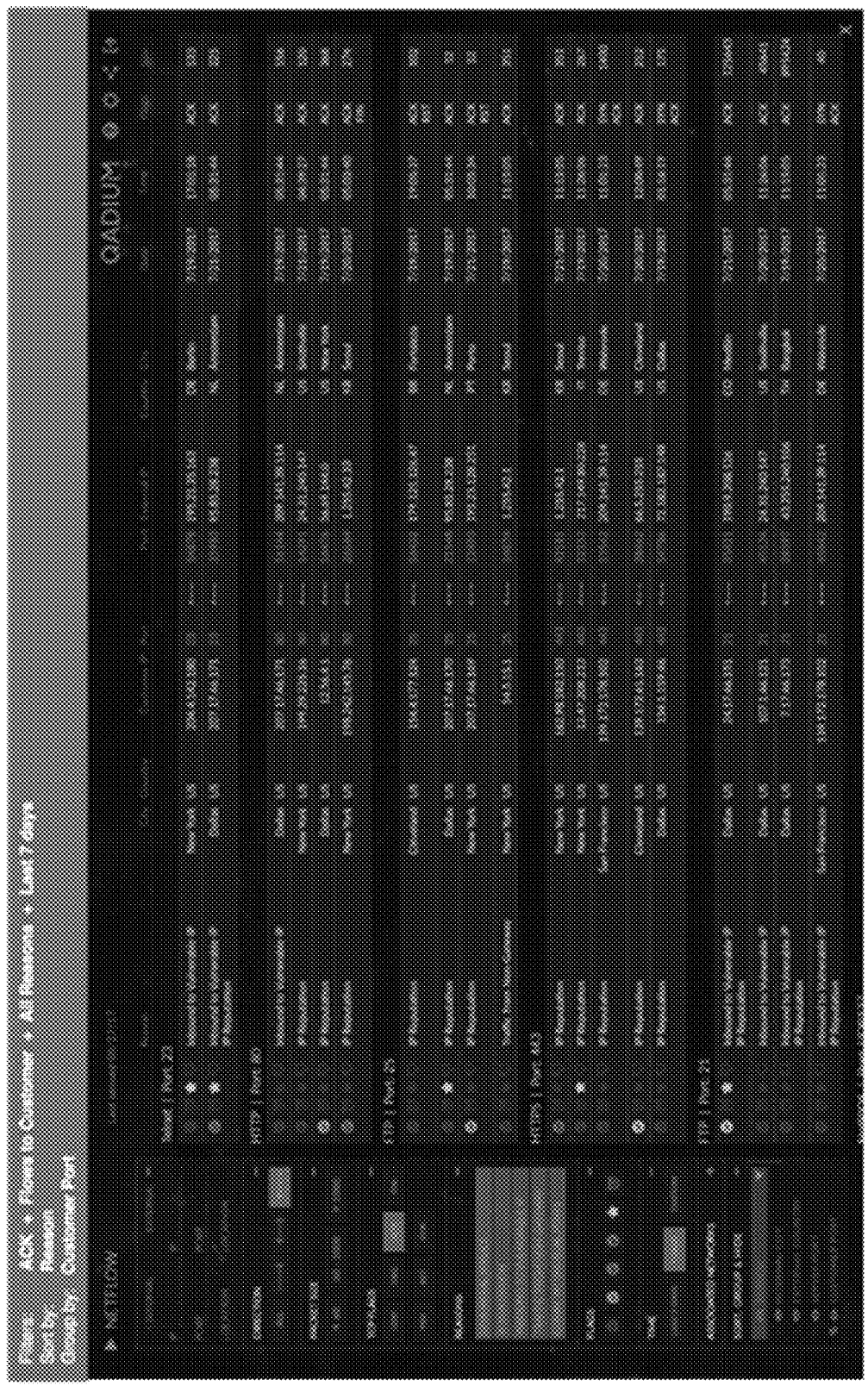
FIG. 13 depicts a report that includes records that satisfy one or more filters.
Figure 14:
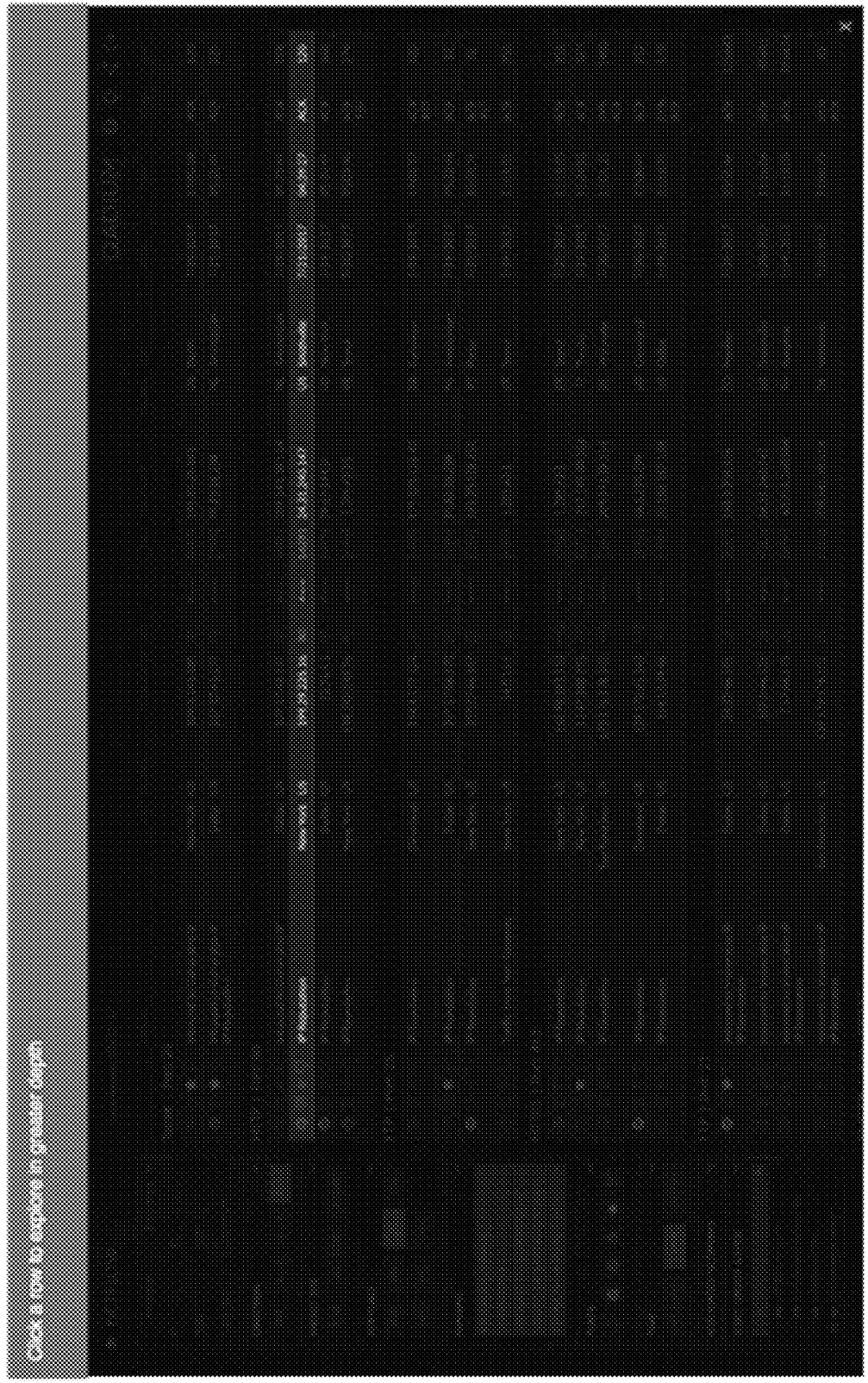
FIG. 14, meanwhile, illustrates how additional information on a record can be provided if a user (e.g., a network administrator) selects the record.

FIGS. 13-14 depicts several examples of reports that may be generated by a security management platform. FIG. 13 depicts a report that includes records that satisfy one or more filters. Here, four different filters have been specified (i.e., ACK, Flows to Customer, All Reasons, and Last 7 Days), and records satisfying all four filters have been grouped by port. Each record may correspond to a different security threat to an internal network the security management platform is responsible for managing. For example, Port 80 is associated with four different records corresponding to communications between distinct pairs of internal and external IP addresses. FIG. 14, meanwhile, illustrates how additional information on a record can be provided if a user (e.g., a network administrator) selects the record. For example, the user may select a record to determine what remediation action(s), if any, are recommended by the security management platform. Similarly, the user may select a record to initiate a remediation action (e.g., revoking credentials, preventing access to the Internet, or updating computer software).

Figure 15:
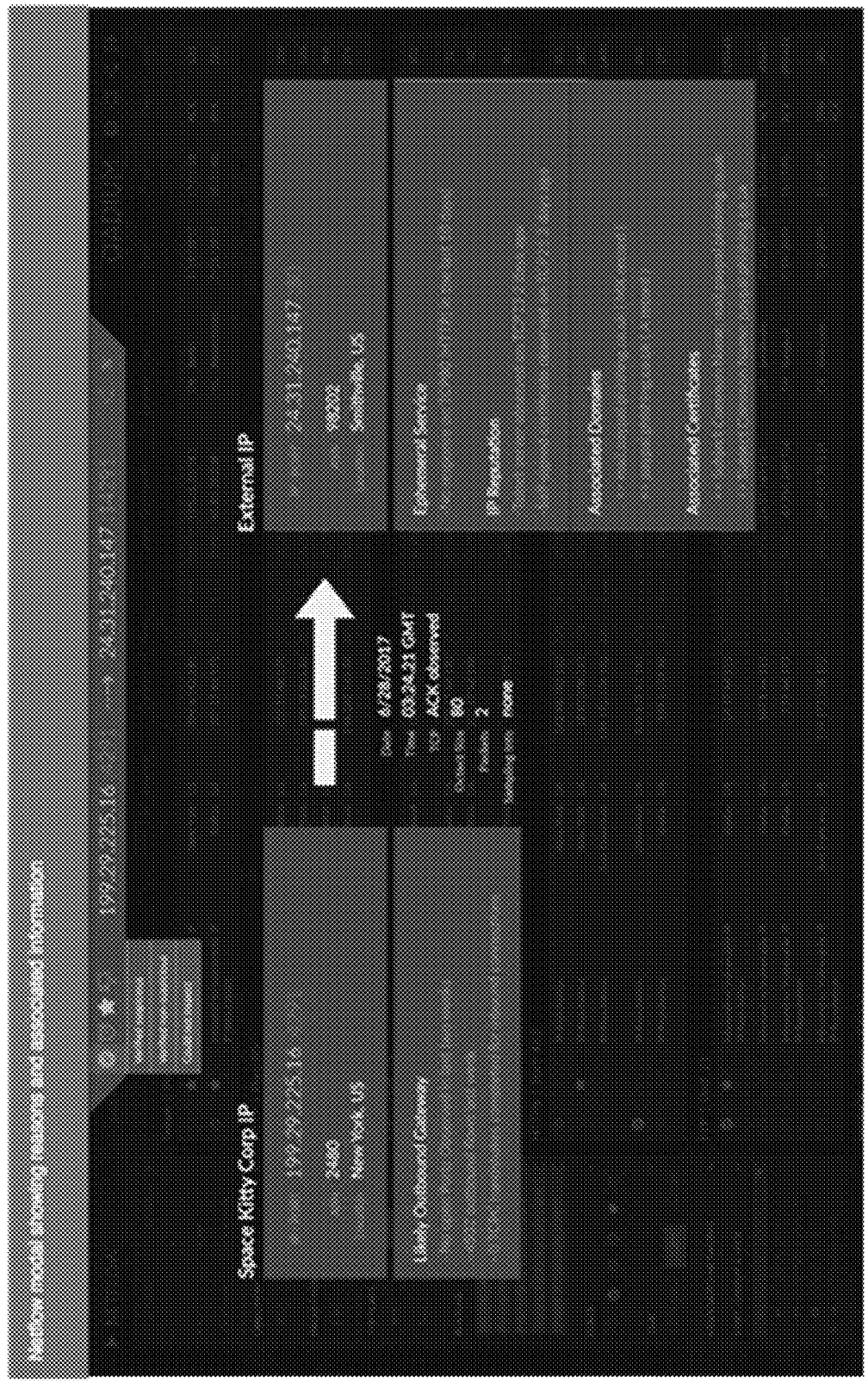
FIG. 15 illustrates how each flow involving an internal IP address belonging to an organization can be modeled as a transmission of data packets to, or the receipt of data packets from, an external IP address.

FIG. 15 illustrates how each flow involving an internal IP address belonging to an organization can be modeled as a transmission of data packets to, or the receipt of data packets from, an external IP address. Here, for example, IP address 199.29.255.16 belonging to Space Kitty Corp has transmitted two data packets to external IP address 24.31.240.147. Other information relevant to the risk determination may also be posted to the interface for review by the user. Examples of such information include the port number, geographical location, packet size, whether an acknowledgement was received, etc.

Figure 16:
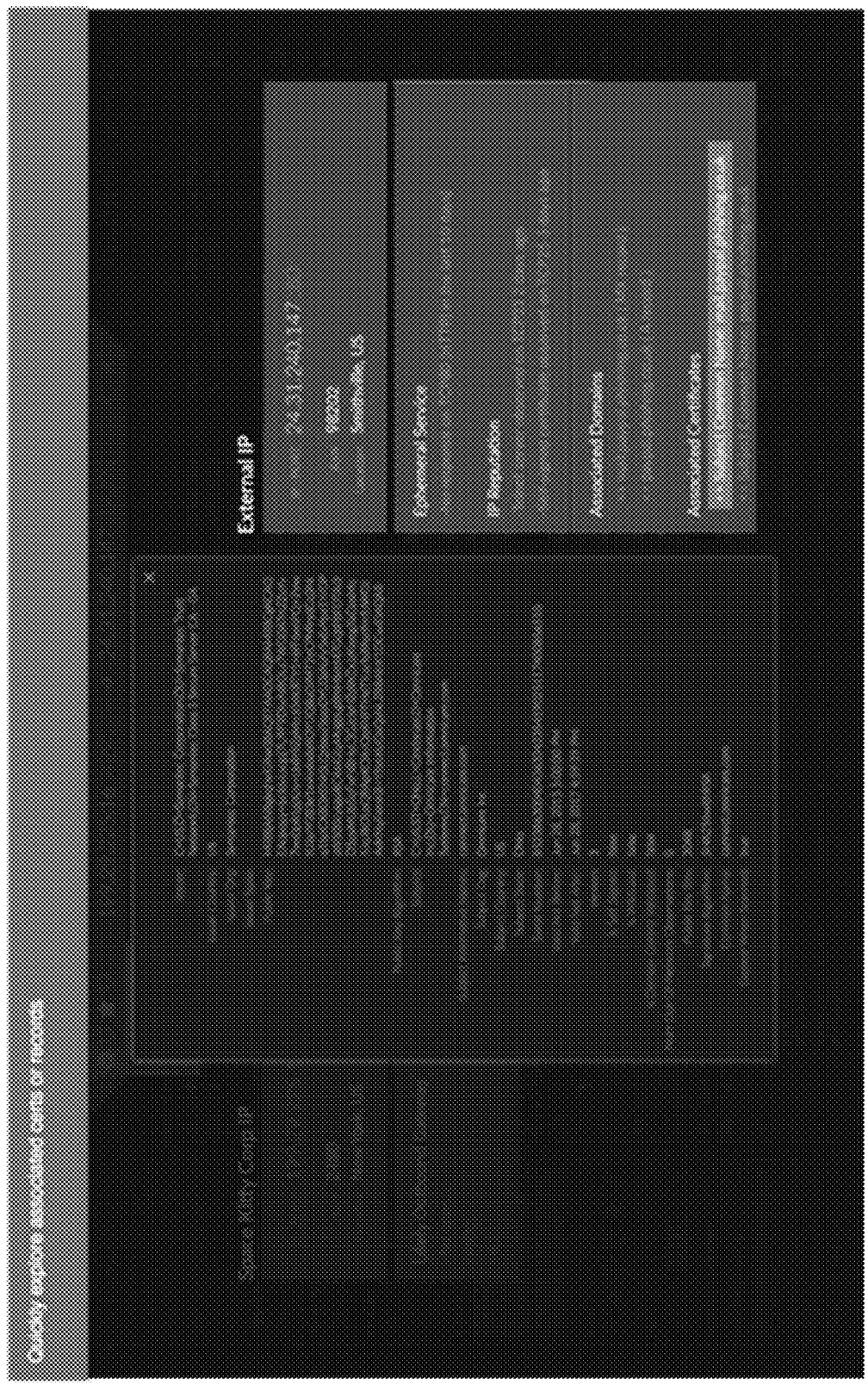
FIG. 16 illustrates how individual certificates, domains, or notes associated with a record can be readily explored by a user.

FIG. 16 illustrates how individual certificates, domains, or notes associated with a record can be readily explored by a user. Upon selecting a record, a report that includes information related to the record may be shown to the user for further review. Here, for example, the report pertains to an external IP address 24.31.240.147 that communicates via port 80. Other information (e.g., the Autonomous System Number (ASN), owner, registration date, etc.) may also be shown. The user may be able to review details regarding a particular certificate, domain, or note by selecting it on the report.

Figure 17:
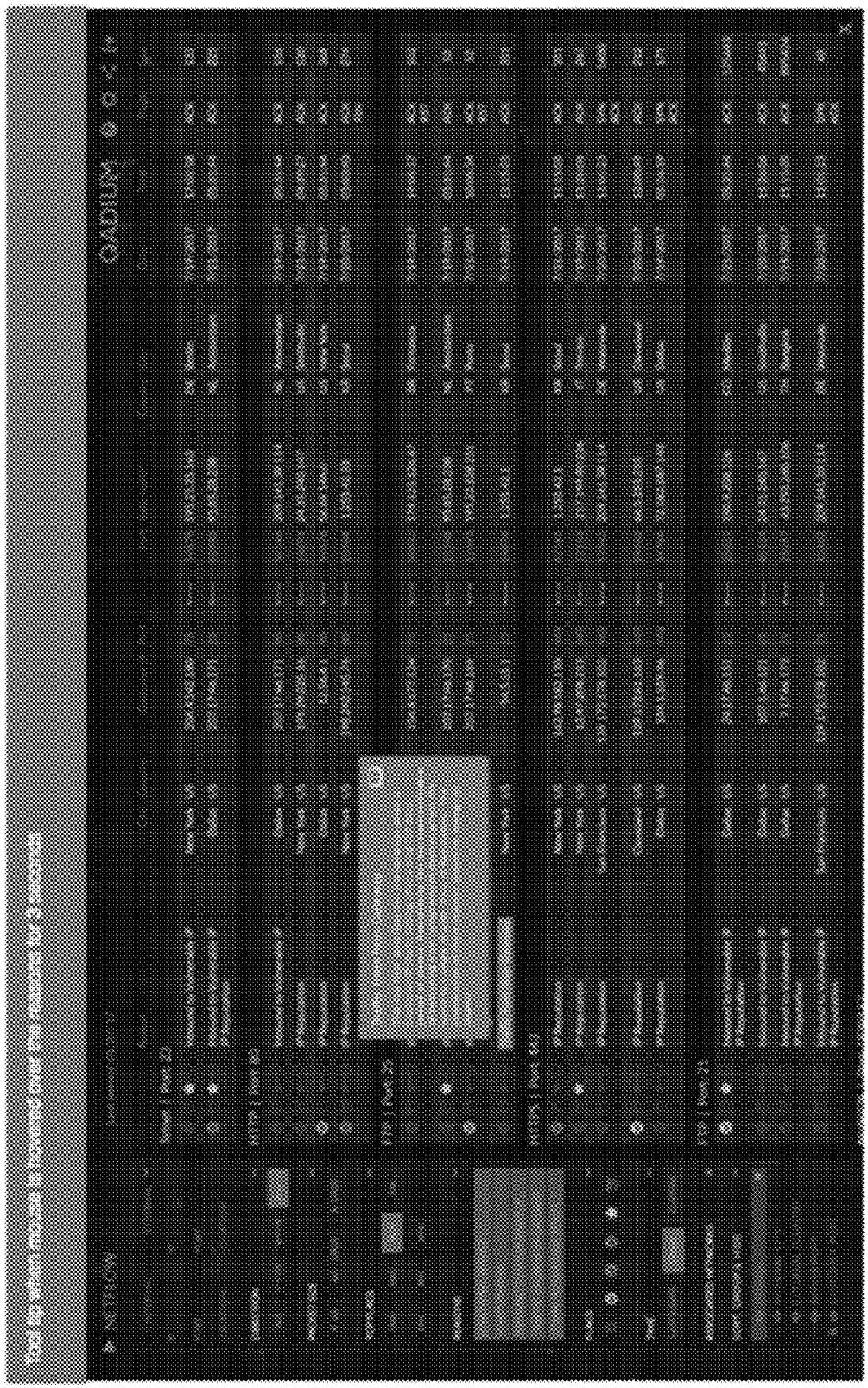
FIG. 17 illustrates an example of a tool tip that could be shown within a filter report.

FIG. 17 illustrates an example of a tool tip that could be shown within a filter report. A tool tip may be shown if the user hovers over an item for a predetermined duration (e.g., 2 seconds, 3 seconds, 5 seconds) or performs a certain action involving the item (e.g., right clicks or double clicks). Tool tips can relate to a variety of topics. Here, for example, the tool tip explains the term "Traffic from Non-Gateway." Similar explanations may be available for the other reasons shown in FIG. 17 (e.g., Inbound to Vulnerable IP and IP Reputation), as well as others not shown here.

Figure 18:
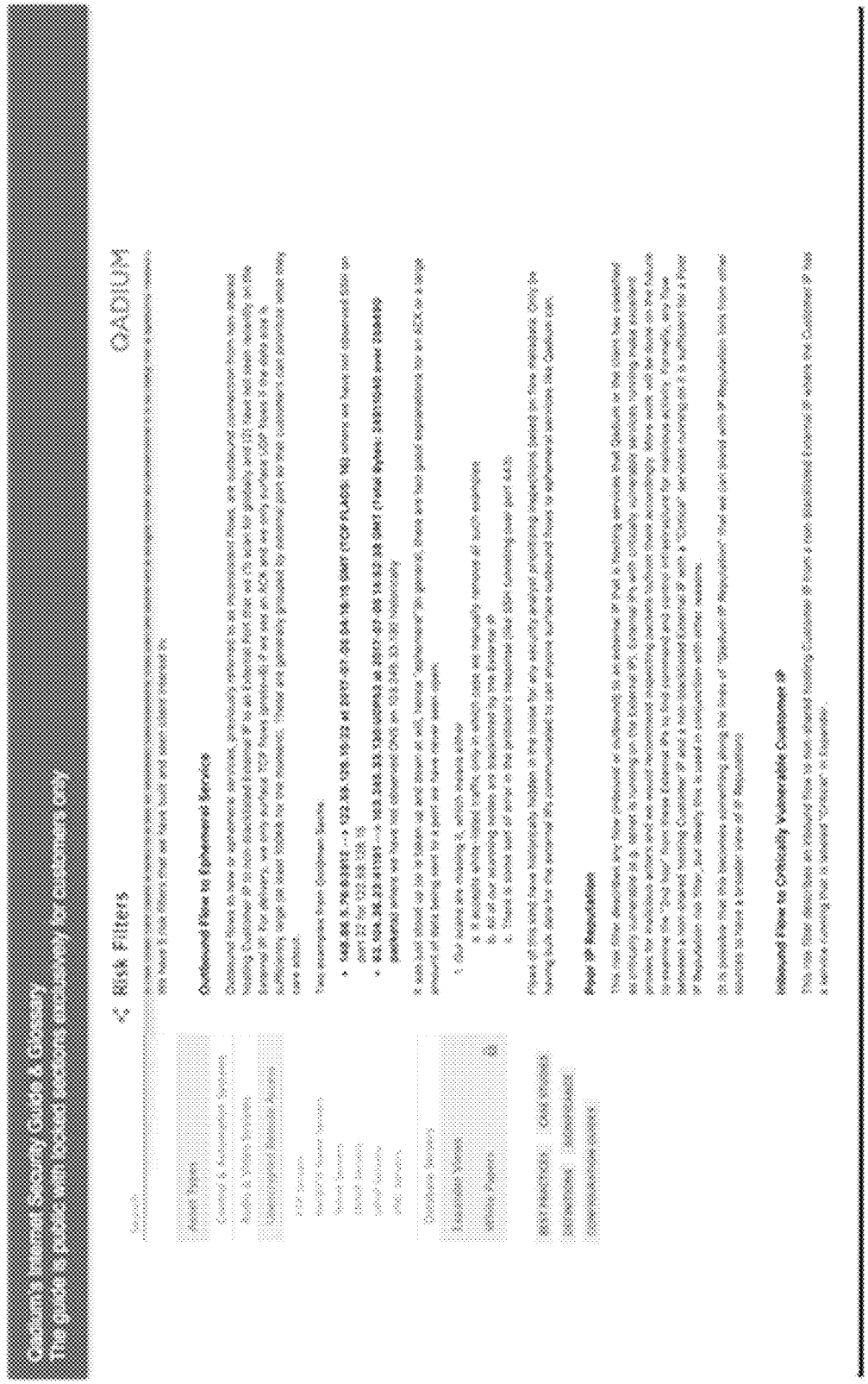
FIG. 18 depicts portions of a security guide that summarizes various features of the security management platform.
Figure 19:
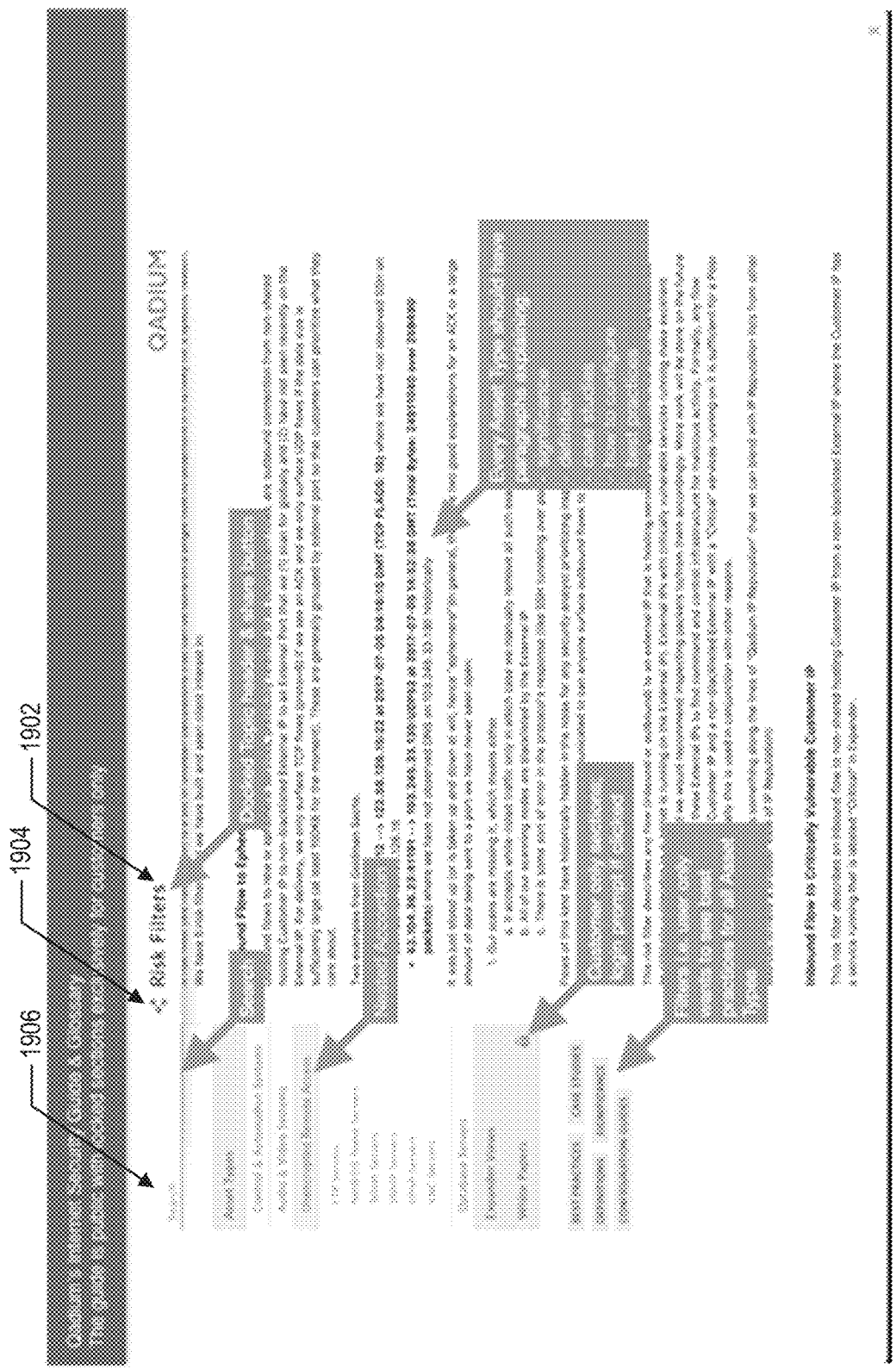
FIG. 19 includes a series of tags that label different segments of the security guide.

FIGS. 18-19 depict portions of a security guide that summarizes various features of the security management platform. More specifically, the portion of the security guide shown in FIG. 18 describes several different kinds of risk filters. In addition to general information regarding the security management platform, the security guide could also include a glossary of often-used terms, diagram representations of different network configurations, white papers, etc.

FIG. 19 includes a series of tags that label different segments of the security guide. Generally, a topic header 1902 is docked along the top of the interface when the security guide is viewed on a computing device (e.g., a mobile phone, laptop computer, or desktop computer). Thus, as a user browses information related to, for example, risk filters, the relevant topic header (e.g., "Risk Filters") may be docked along the top of the interface. When the user begins browsing information related to a different topic, a new topic header can replace the existing topic header. In some embodiments, the interface also includes a share button 1904 that, upon selection, allows a user to share the section of the security guide currently being viewed with one or more other users. Section(s) of the security guide can be shared via different forms of electronic communications, including emails, text messages, hyperlinks, etc.

As noted above, the security guide can include descriptions of different types of assets. Each asset type may have paragraphs explaining significance, definition, case studies, how to configure, and/or best practices. Some sections of the security guide may be publicly available, while other sections of the security guide may be private (i.e., unlocked only for customers of the security management platform able to log in with appropriate credentials).

In some embodiments, the security guide includes a search field 1906 that permits users to readily search the entire security guide by entering one or more terms. A user may also specify that searches should be limited to certain portions of the security guide (e.g., the portion currently being viewed). The security guide may also permit the user to specify filter(s). For example, the user could filter content of the security guide to only show best practices for each asset type.

Security Management Platforms

Security management platforms (also referred to as "security event detection systems") able to examine traffic traversing one or more networks to detect security threats are described herein. As shown in FIG. 5, a security management platform can include a threat detection module and a repository. The security management platform may also include an interface configured to receive network traffic data and/or active probe data associated with a computing device. In some embodiments, different interfaces receive these different types of data.

By parsing these data, the threat detection module can determine whether any correlations exist between the network traffic data and the active probe data, as well as determine whether these correlations indicate that a security event has occurred. In the event that the correlation indicates a security event has occurred, the threat detection module can indicate that the security event is associated with a particular computing device. The threat detection module may know which computing device(s) are involved in a security event from the active probe data. The term "security event" generally refers to any event that results in an increased security threat. The communication activities corresponding to the risk filters described above would be deemed security events. Thus, examples of security events include the detection of a communication with a new or ephemeral service, detection of a vulnerable computing device residing on an internal network (also referred to as an "internal computing device," "organization computing device," or "customer computing device"), detection of a communication from an internal computing device to a computing device that is vulnerable to takeover and resides outside of the internal network (also referred to as an "external computing device"), detection of a communication involving an internal computing device that has not been involved in any communications for a specified time internal (e.g., several days, weeks, or months), etc.

More generally, a security management platform can utilize two different types of data to identify security events involving computing devices that are connected to the Internet: (1) active sensing data; and (2) netflow data.

Active sensing data includes information that is received from a computing device as a result of a probe of that computing device while the computing device is connected to a computer network (e.g., the Internet). Probes can actively seek information from any IP addresses accessible on the computer network. The repository may include open ports, available services, certificates, computing device information, or any other type of information available from a probe of a computing device over a network. In some embodiments, multiple probes of a single computing device are performed at different times over a certain time interval. Such action may allow the security management platform to readily discover changes in security risk over time. Moreover, multiple probes of different computing devices can be simultaneously performed at a single point in time.

Netflow data includes information related to traffic traversing a computer network (e.g., an internal network or the Internet). Examples include the source information and destination information for packet(s), the time of transmission and/or reception of the packet(s), hop data along the path(s) from the source to the destination, etc. Network traffic data could come from a network administrator, an organization, an ISP, a routing device (e.g., switches 104a, 104d or routers 104b, 104c of FIG. 1), a firewall device, a security information and event management (SIEM) system, or any other appropriate collection source or storage for traffic information.

By examining the correlation between these two data types, a security management platform can identify security threats to a computer network (e.g., an internal network associated with an organization). In some cases, timing information is used as part of the determination for security events discovered in either data type. For example, a computing device that had not communicated with any other computing devices residing outside of its local network for an extended period of time (e.g., 145 minutes, 7 hours, 30 days, 57 days, etc.) but suddenly begins communicating is typically given a higher risk score because there is a lower probability that the organization responsible for managing the computing device was monitoring the computing device to log/inspect these communications. Once a security event has been identified, the identification may trigger filtering of traffic leaving/entering the computing device. Alternatively, the identification may trigger filtering of the traffic leaving/entering the computer network on which the computing device resides. Such action may be necessary to ensure that related security threats affecting other computing devices on the computer network are also properly identified. The identification may also prompt the creation and/or modification of a blacklist, the generation of alerts regarding the communications and relevant computing device(s), the prediction of other computing device(s) that may become engaged in similar activity, etc.

Figure 20:
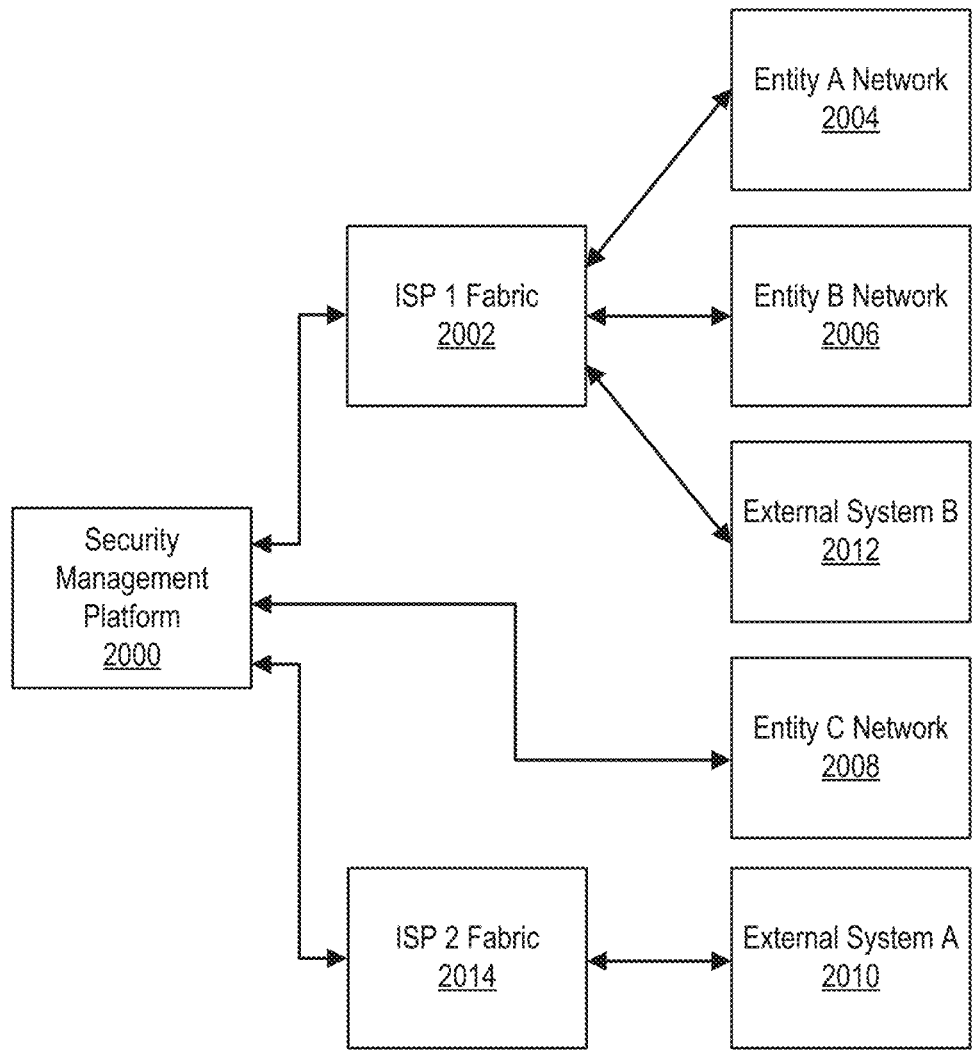
FIG. 20 is a block diagram illustrating an example of a security management platform configured to detect security events by examining netflow data acquired from one or more sources.

FIG. 20 is a block diagram illustrating an example of a security management platform 2000 configured to detect security events by examining netflow data acquired from one or more sources. As noted above, the security management platform 2000 can also actively probe the IP addresses accessible on a computer network (e.g., the Internet), and then store information regarding any responses received based on the probing. When an IP address is probed, the security management platform 2000 can learn information regarding available services, open ports, software versions, certificates, metadata information, and other relevant information about the computing device corresponding to the IP address. Probes can be performed at different times so that the risk to an IP address (or the risk posed by the IP address) can be established over time by examining stored information related to the IP address.

IP addresses may be associated with computing devices (e.g., external system A 2010 and external system B 2012), computer networks (e.g., entity A network 2004, entity B network 2006, and entity C network 2008), and/or ISP fabrics (e.g., ISP 1 fabric 2002 and ISP 2 fabric 2014). In some embodiments, the security management platform 2000 receives netflow data directly from the source. Here, for example, the security management platform 2000 receives netflow data directly from entity C network 2008. In other embodiments, the security management platform 2000 receives network data indirectly from the source. Here, for example, the security management platform 2000 may receive netflow data associated with entity network A 2004 or external system B 2012 from ISP 1 fabric 2002.

As noted above, the security management platform 2000 may be configured to monitor the security of IP addresses residing on an internal network (also referred to as an "organization network," "customer network," or "entity network"). In such embodiments, the security management platform 2000 may communicate with the IP addresses via a first computer network (e.g., ISP 1 fabric 2002 and/or ISP 2 fabric 2014) and a second computer network (e.g., entity A network 2004, entity B network 2006, and/or entity C network 2008).

Netflow data can be used to infer/discover characteristics of the traffic traversing a corresponding computer network. Thus, netflow data may indicate the source of the traffic, the destination of the traffic, the time/date associated with transmission of the traffic, hop information (e.g., which route the traffic took from the source to the destination), the number of bytes transmitted, the type of data transmitted, the state of a transmission control protocol's multi-step handshake, etc. Netflow data could be received from an entity network, an external system, an existing database of traffic data, an ISP, and/or some other appropriate source.

Figure 21:
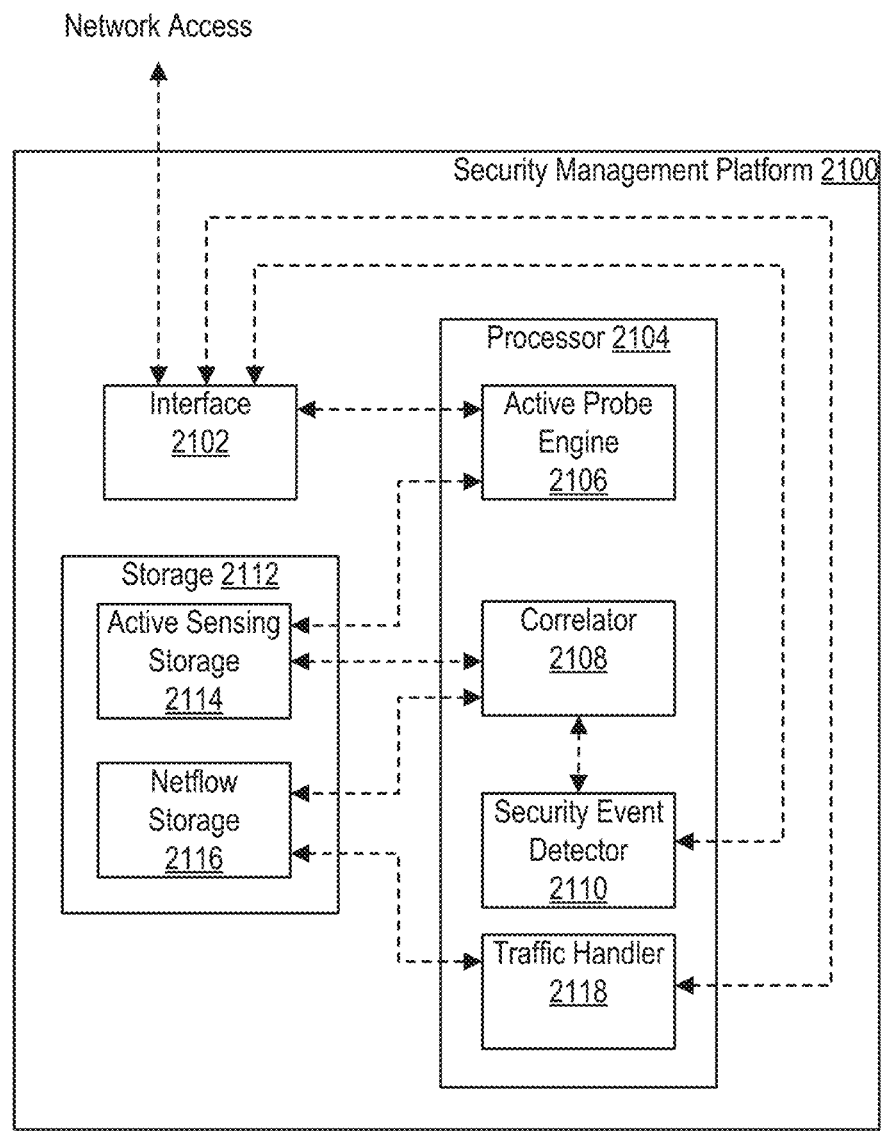
FIG. 21 is a block diagram illustrating an example of a security management platform.

FIG. 21 is a block diagram illustrating an example of a security management platform 2100. The security management platform 2100 may be, for example, the security management platform 2000 of FIG. 20 or the security management platform 506 of FIG. 5. Here, the security management platform 2100 includes a processor 2104 that has an active probe engine 2106. The active probe engine 2106 can be configured to probe IP addresses by generating signals that are transmitted via the interface 2102 across at least one computer network. In some embodiments, the active probe engine 2106 uses commands stored in an active sensing storage 2114 (also referred to as "active probe storage").

Netflow data can also be received by the security management platform 2100 via the interface 2102. The netflow data can then be handled by a traffic handler 2118, which may be configured to parse, filter, and/or format traffic as necessary to be stored in a netflow storage 2116. The active sensing storage 2114 and the netflow storage 2116 may be part of storage 2112. As noted above, netflow data can be received from one or more sources that are communicatively coupled to the interface 2102 (e.g., an external system, an Internet-connected computing device, an ISP, an existing database, a firewall, a router, a SIEM system, etc.).

Security events can be detected by a security event detector 2110 of the processor 2104. More specifically, the security event detector 2110 can examine correlations between data stored in the active sensing storage 2114 and data stored in the netflow storage 2116 as determined by the correlator 2108 of the processor 2104. An organization can be alerted of detected security events by notifications transmitted via the interface 2102. These notifications may prompt the organization to perform some remediation action. Examples of remediation actions include filtering traffic associated with a security event, adding IP address(es) and/or computing device(s) to a blacklist, alerting an administrator about the security event and/or the computing device(s) involved in the security event, etc. In some embodiments, the correlator 2108 further examines the data stored in the active sensing storage 2114 and the netflow storage 2116 to assist the security event detector 2110 in predicting what security events are most likely to occur in the future. Predicted security events may prompt performance of any of the remediation actions described above.

There are many varieties of active probes, and each variety can be used to collect information about the state of a particular IP address and its corresponding computing device. Active probes may also be used to gain information about the state of all IP addresses and their corresponding computing devices that are connected to a given computer network (e.g., an internal network or the Internet). For example, for a given port, a probe could check whether that port is open across all IP addresses available on the Internet. In other embodiments, a probe may attempt a handshake in accordance with the Transport Layer Security (TLS) or Secure Sockets Layer (SSL) Handshake Protocol on a given port. Such action could check for the presence of deprecated protocols allowed in the exchange (e.g., SSL Version 3), as well as analyze characteristics of any certificate(s) that are returned (e.g., short key lengths or self-signed certificates). Probes can also look for the presence of standard services/protocols on standard and non-standard ports associated with those services/protocols, as well as over TCP- and UDP-based connections. For example, the active probe engine 2106 may probe the presence of FTP on ports 21 and 2121, SSH on ports 22 and 2222, Telnet on ports 23 and 2323, SMTP on ports 22, 465, and 587, Domain Name System (DNS) on ports 53 and 5353, HTTP on ports 80 and 8080, POP3 on ports 110 and 993, NTP on port 123, NetBIOS on ports 137, 138, and 139, IMAP on ports 143 and 995, SNMP on ports 161, 162, and 199, LDAP on ports 389 and 636, HTTPS on ports 443 and 8443, SMB on port 445, Kerberos on ports 464, 543, 544, 749, 750, 751, 752, 753, 754, and 760, RPC on port 530, MSSQL on port 1433 and 1434, OracleDB on ports 1521, 2483, and 2484, MySQL on port 3306, RDP on port 3389, SIP on ports 5060 and 5061, PostgreSQL on port 5432, VNC on port 5800, Redis on port 6379, MongoDB on port 27017, UPnP on port 1900, etc. The active probe engine 2106 can examine whether any of the aforementioned protocols (as well as other protocols not mentioned here) are running on any combination of one or more ports. Each probe can return information about the presence or absence of a given service on a given port, in addition to information about the service itself, such as the software version, manufacturer, etc. This information can be analyzed to assess the vulnerability of the given service to exploitation to an unauthorized entity or a hostile actor.

The netflow storage 2116 can include details about all communications involving the IP addresses of interest. These IP address may include those that are statically or dynamically allocated to an organization or an entity of interest to the organization (e.g., a division, subsidiary, or vendor), as well as those that have historically been associated with malicious activity by the implementer of the security management platform 2100, the organization, an open source database, or any other source. These details can include information about the source or destination of the communications, such as the IP addresses involved, the port number of a source computing device, the ASN used for routing, location information about the source computing device (e.g., the country within which the source computing device resides), etc. These details can also include information about the communication itself, such as the time of transmission/reception, the protocol used, the number of packets, the size of the transmission, information regarding sampling performed by a listening mechanism (e.g., a flow collector or a scanner) that recorded the traffic, etc.

As noted above, the correlator 2108 can use data from the active sensing storage 2114 and the netflow storage 2116 to detect potential security events. Examples of security events include communications with new or ephemeral services, communications involving a vulnerable internal computing device (e.g., a computing device managed by an organization that resides within an internal network), communications involving a vulnerable external computing device (e.g., a computing device that resides outside of the internal network), and communications with non-gateway computing devices.

Organization communications with new or ephemeral services can be detected whenever an IP address that is statically or dynamically allocated to, or otherwise owned, managed, or operated by or on behalf of, an organization, a subsidiary of the organization, a vendor of the organization, or of general interest to the organization, communicates with a service that was not detected by the active probe engine 2106 despite recent historical probe(s) of the IP address. These IP addresses are often referred to as "organization IP addresses," "customer IP addresses," or "internal IP addresses." The time interval over which prior probe(s) discovered no corresponding service detection can be various lengths (e.g., 5 minutes, 3 hours, 8 days, 3 months, etc.). Moreover, the time between consecutive prior probes may vary. For example, a first prior probe and a second prior probe may be separated by several days, while the second prior probe and a third prior probe may be separated by several weeks.

Generally, risk to an organization network is greatly heightened if an inbound communication to an internal IP address is accompanied by a corresponding outbound communication from the internal IP address. In such instances, the internal IP address may represent the source as seen in the network traffic datum, or the port associated with the internal IP address may be a high number while the port associated with the external IP address is associated with a common service. Examples of common services include FTP on ports 21 and 2121, SSH on ports 22 and 2222, Telnet on ports 23 and 2323, SMTP on ports 25, 465, and 587, DNS on ports 53 and 5353, HTTP on ports 80 and 8080, POP3 on ports 110 and 993, NTP on port 123, NetBIOS on ports 137, 138, and 139, IMAP on ports 143 and 995, SNMP on ports 161, 162, and 199, LDAP on ports 389 and 636, HTTPS on ports 443 and 8443, SMB on port 445, Kerberos on ports 464, 543, 544, 749, 750, 751, 752, 753, 754, and 760, RPC on port 530, MSSQL on port 1433 and 1434, OracleDB on ports 1521, 2483, and 2484, MySQL on port 3306, RDP on port 3389, SIP on ports 5060 and 5061, PostgreSQL on port 5432, VNC on port 5800, Redis on port 6379, MongoDB on port 27017, UPnP on port 1900, any of the aforementioned protocols running on another port, or any other service running on another port.

If the port number is at least 1024 and all of the above conditions are met, then the security management platform 2100 can conclude that a communication with a new or ephemeral service occurred with low confidence. However, if the port number is at least 10,000 and all of the above conditions are met, then the security management platform 2100 can conclude that a communication with a new or ephemeral service occurred with high confidence. The three potential conclusions from this correlation are (1) the external IP address is configured to not respond to probes by the active probe engine 2106; (2) the external IP address began responding very recently; or (3) the external IP addresses was stood up very briefly to communicate with the internal IP address. Because the latter two potential conclusions are consistent with the attack patterns typically employed by unauthorized entities, each of these could be flagged as a potential security event.

Organization communications with a vulnerable computing device can be identified whenever a communication is detected that involves an internal IP address running a non-HTTP, non-HTTPS, or non-DNS service. Examples of such services include FTP on ports 21 and 2121, SSH on port 22 and 2222, Telnet on ports 23 and 2323, NTP on port 123, NetBIOS on ports 137, 138, and 139, SNMP on ports 161, 162, and 199, LDAP on ports 389 and 636, SMB on port 445, Kerberos on ports 464, 543, 544, 749, 750, 751, 752, 753, 754, and 760, RPC on port 530, MSSQL on ports 1433 and 1434, OracleDB on ports 1521, 2483, and 2484, MySQL on port 3306, RDP on port 3389, SIP on ports 5060 and 5061, PostgreSQL on port 5432, VNC on port 5800, Redis on port 6379, MongoDB on port 27017, UPnP on port 1900, any of the aforementioned protocols running on another port, and any other non-HTTP, non-HTTPS, or non-DNS service that is not designed to be accessible on the public Internet by its authors (and thus has less security hardening put in during the programming of the service). Organization communications involving a vulnerable computing device can also occur whenever a communication is detected that involves an internal IP address having known vulnerabilities, such as running an end-of-life HTTP or HTTPS service, poor cryptographic health on an HTTPS service such as a self-signed certificate or manufacturer's default certificate, an old DNS service with publicly disclosed vulnerabilities, etc. Any of the aforementioned services running on a computing device can make that computing device vulnerable to compromise by an unauthorized entity. Any communication from a vulnerable external computing device to an internal computing device or from an external computing device to a vulnerable internal computing device may represent a security event.

Organization communications with a vulnerable external computing device can be identified whenever a communication involving an internal IP address is detected, where the internal computing device corresponding to the internal IP address is running a common service. Examples of common services include FTP on ports 21 and 2121, SSH on port 22 and 2222, Telnet on ports 23 and 2323, SMTP on ports 25, 465, and 587, DNS on ports 53 and 5353, HTTP on port 80, POP3 on ports 110 and 993, NTP on port 123, NetBIOS on ports 137, 138, and 139, IMAP on ports 143 and 995, SNMP on ports 161, 162, and 199, LDAP on ports 389 and 636, HTTPS on port 443, SMB on port 445, Kerberos on ports 464, 543, 544, 749, 750, 751, 752, 753, 754, and 760, RPC on port 530, MSSQL on ports 1433 and 1434, OracleDB on ports 1521, 2483, and 2484, MySQL on port 3306, RDP on port 3389, SIP on ports 5060 and 5061, PostgreSQL on port 5432, VNC on port 5800, Redis on port 6379, MongoDB on port 27017, UPnP on port 1900, or any other ports associated with commonly used protocols/services on the Internet. The security management platform 2100 may also look for certificates used for public key cryptography returned for a successful SSL/TLS handshake that are self-signed or use deprecated ciphers or signing algorithms. These services are often considered vulnerable for several reasons, so there is an increased probability that an internal computing device running one of these services has been compromised by a malicious actor for use as a proxy for malicious traffic. For this reason, communications between a vulnerable external computing device and an internal IP address has a higher probability of being malicious in nature, and thus can be classified as a security event.

Organization communications transmitted from a non-gateway device can be identified whenever a communication is detected involving an internal IP address that has not recently responded to any scans performed by the active probe engine 2106 and has not historically been involved in external communications. Organizations are less likely to monitor traffic for security events on computing devices that do not normally communicate with the Internet, so malicious actors may try to access the internal network using internal IP addresses of this nature. Accordingly, communications involving these internal IP addresses could represent security events.

Figure 22:
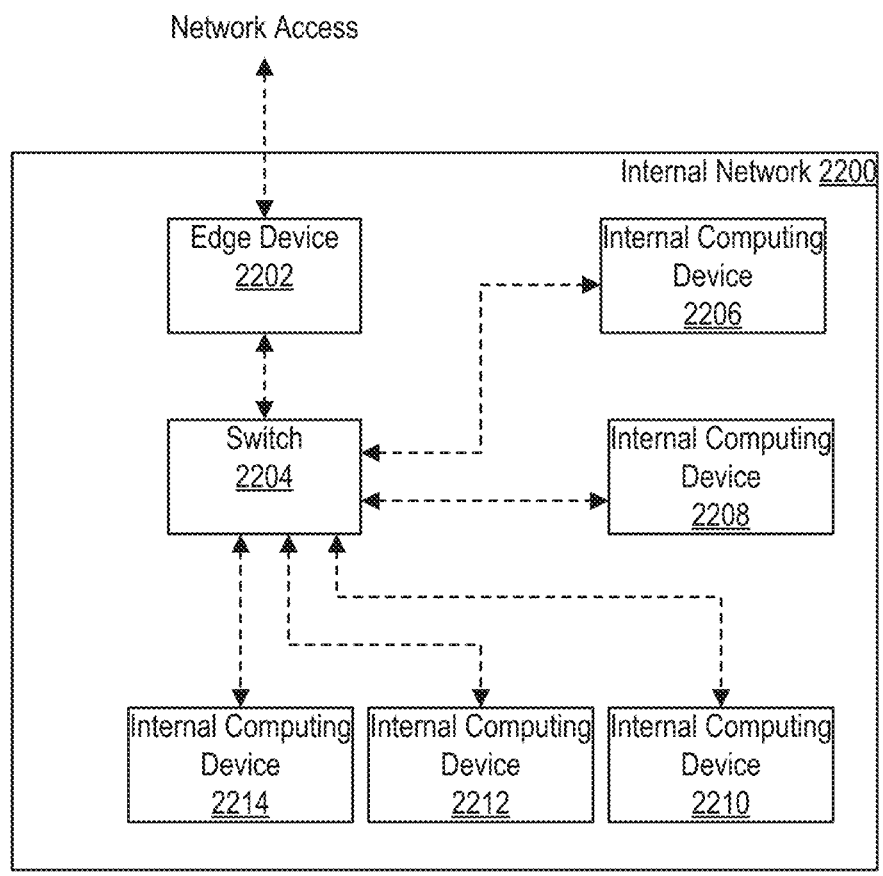
FIG. 22 is a block diagram illustrating an example of an internal network (also referred to as an "entity network," "organization network," or "customer network").

FIG. 22 is a block diagram illustrating an example of an internal network 2200 (also referred to as an "entity network," "organization network," or "customer network"). The internal network 2200 may be entity A network 2004, entity B network 2006, or entity C network 2008 of FIG. 20. The internal network 2200 can interface with another computer network (e.g., the Internet) via an edge computing device 2202 (also referred to as an "edge device"). More specifically, all traffic entering/exiting the internal network 2200 may be handled by the edge device 2202. Traffic coming into the entity network 2200 can also be examined and/or filtered by the edge device 2202. In some embodiments, the edge device 2002 includes a firewall.

Incoming traffic can then be passed to a switch 2204, which routes the traffic within the internal network 2200 to one or more internal systems (e.g., internal computing device 2206, internal computing device 2208, internal computing device 2210, internal computing device 2212, or internal computing device 2214). In some embodiments, the internal network 2200 includes more than one edge device. Similarly, the internal network 2200 may include more than one switch responsible for routing traffic. For traffic exiting the internal network 2200, traffic originating from an internal system can be routed from the switch 2204 to the edge device 2202 and then to an external computer network (e.g., the Internet). Meanwhile, probes from a security management platform (e.g., security management platform 506 of FIG. 5) can come into the internal network 2200 at the edge device 2202, and then replies to these probes can be returned by exiting the internal network 2200 at the edge device 2202. In some embodiments, traffic within the internal network 2200 is measured by the switch 2204 or the edge device 2202. In other embodiments, traffic within the internal network 2200 is independently measured by each internal system and then aggregated (e.g., by the switch 2204 or the edge device 2202).

Figure 23:
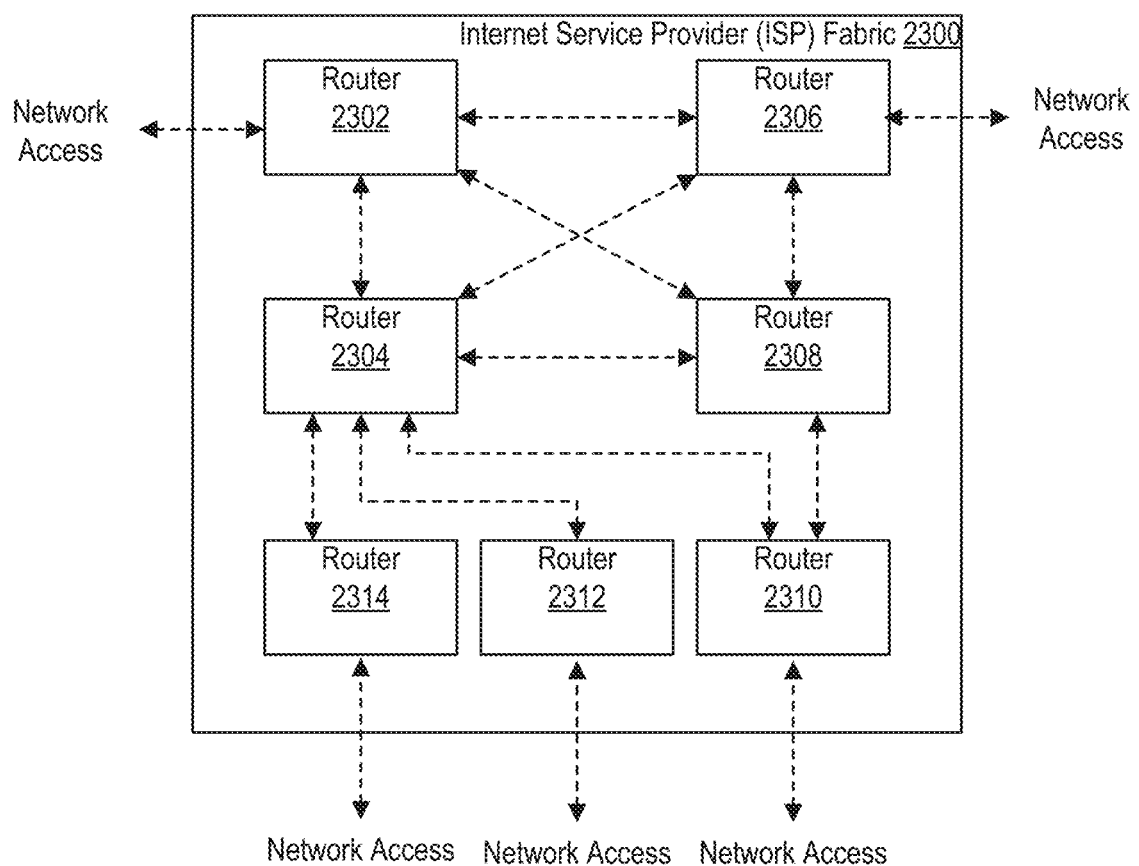
FIG. 23 is a block diagram illustrating an example of an Internet service provider (ISP) fabric.

FIG. 23 is a block diagram illustrating an example of an Internet service provider (ISP) fabric 2300. The ISP fabric 2300 may be the ISP 1 fabric 2002 or ISP 2 fabric 2014 of FIG. 20. The ISP fabric 2300 can act as a network by relaying traffic downstream using multiple routers (e.g., router 2302, router 2304, router 2306, router 2308, router 2310, router 2312, or router 2314). These routers are responsible for routing traffic received at an ingress point of the ISP fabric 2300 to an appropriate egress point of the ISP fabric 2300 along the way toward a final destination (e.g., recipient device 106 of FIG. 1). In some embodiments, at least one of the routers logs flows and reports traffic information (e.g., to a security management platform). For example, a given router may monitor and store information regarding all traffic that passes through the given router. Examples of such information include information related to the source of the traffic, the destination of the traffic, path information, data packet information, number of bytes in the traffic, etc.

Figure 24:
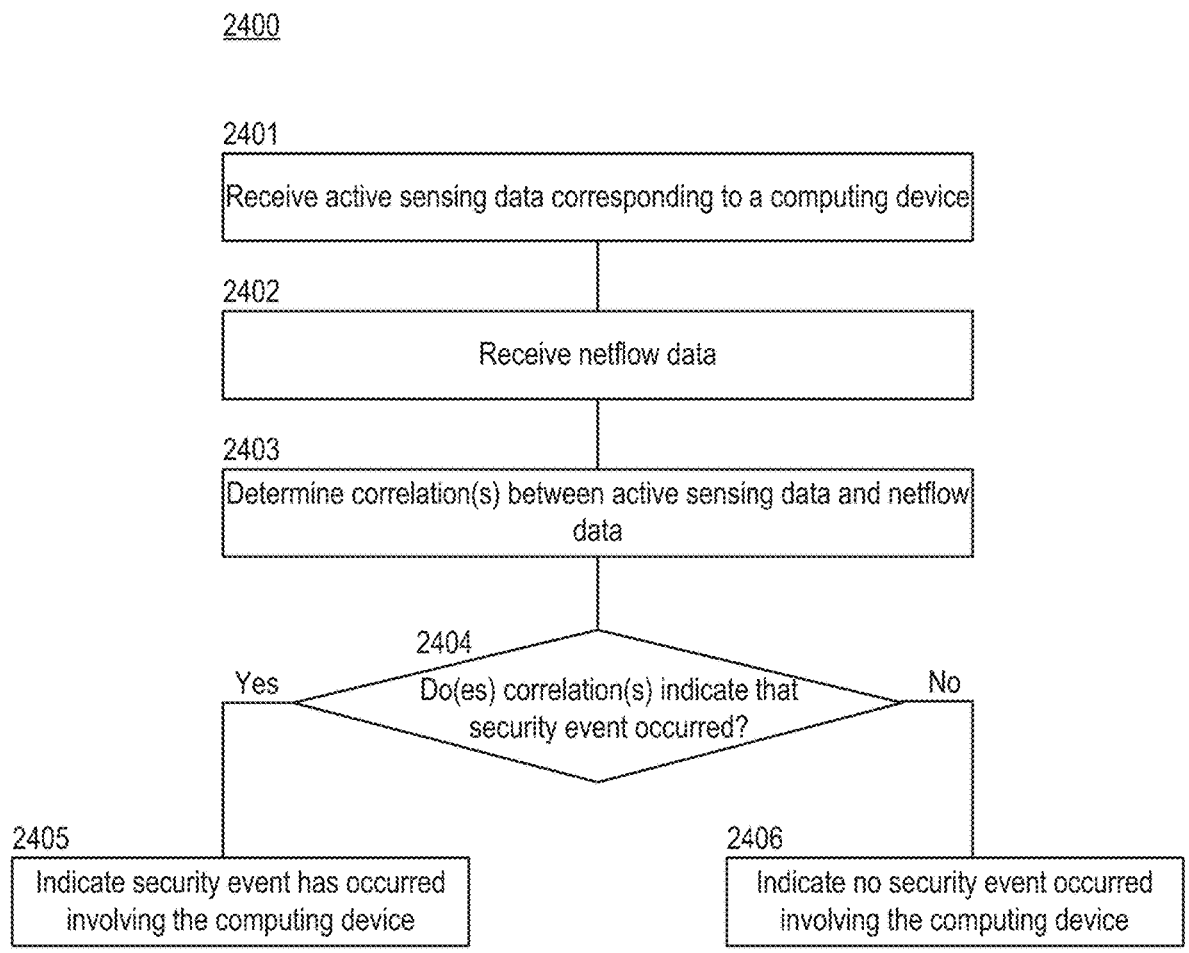
FIG. 24 depicts a flow diagram of a process for detecting a security event involving a computing device.

FIG. 24 depicts a flow diagram of a process 2400 for detecting a security event involving a computing device. The process may be executed by a processor of a security management platform (e.g., processor 2104 of FIG. 21). At step 2401, the processor receives active sensing data related to the computing device. For example, the security management platform may actively probe the computing device by sending a signal to a corresponding IP address that is intended to elicit a response. Upon receiving a response to the probe, the security management platform may store data indicative of the response in a storage. Probes of the computing device may be periodically performed to detect changes in the state of the computing device based on its history as determined based on the active sensing data. At step 2402, the processor receives netflow data. The netflow data describes traffic traversing a computer network (e.g., an internal network or the Internet). Thus, in some embodiments the netflow data is acquired from an organization, while in other embodiments the netflow data is acquired from one or more ISPs.

At step 2403, the processor can determine whether correlation(s) exist between the active sensing data and the netflow data. Said another way, the processor may parse the active sensing data and the netflow data to discover risk filters indicative of security threats. At step 2404, the processor can determine whether correlation(s) indicate that a security event occurred. In the event that a determination is made that a security event occurred, then, at step 2405, the processor can indicate that the security event involving the computing device occurred. For example, the processor may cause a notification to be generated that alerts an administrator associated with the computer network on which the computing device resides to take appropriate action. However, in the event that a determination is made that no security event occurred, then, at step 2406, the processor can indicate that no security event involving the computing device occurred. Other embodiments of the process 2400 may reverse the order of receiving active sensing data and netflow data. Moreover, either type of data could be received on a periodic basis (e.g., hourly, daily, or weekly) or a continual basis.

Figure 25:
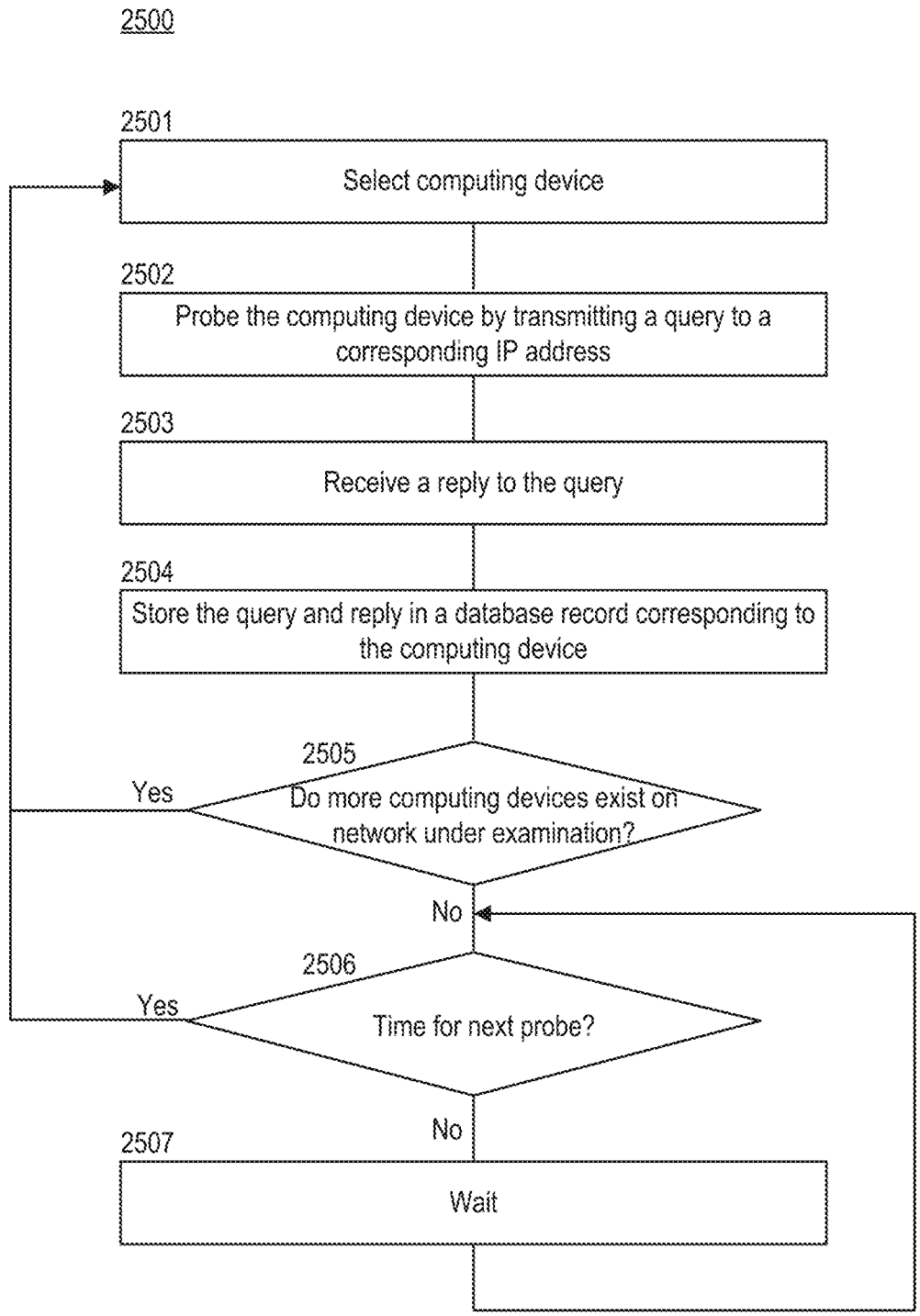
FIG. 25 depicts a flow diagram of a process for actively probing a computing device that resides on a computer network under examination.

FIG. 25 depicts a flow diagram of a process 2500 for actively probing a computing device that resides on a computer network under examination. In some embodiments the computing device is an internal computing device that resides on an internal network (e.g., an organization intranet), while in other embodiments the computing device is an external network device that resides on some other network (e.g., the Internet). The process may be executed by a processor of a security management platform (e.g., processor 2104 of FIG. 21).

At step 2501, the processor can select a computing device to be actively probed. For example, if the computing device is an internal computing device that resides on an internal network, then the processor may have selected the computing device from a list of computing devices associated with an organization. In such embodiments, each computing device managed by the organization may be periodically selected for probing. As another example, if the computing device is an external network device that resides on the Internet, then the processor may have randomly selected the computing device, selected the computing device due to its connection to an internal computing device, etc.

At step 2502, the processor can probe the computing device by transmitting a query to a corresponding IP address. The query is transmitted to the computing device with the intent that it provokes a response, which can be examined by the security management platform to determine what risk, if any, is posed by the computing device. Additionally or alternatively, the security management platform can determine what risk, if any, is experienced by the computing device itself. At step 2503, the processor can receive a reply to the query from the computing device. In some embodiments, the processor stores the query and reply in a storage for further examination. For example, as shown at step 2504, the processor may store the query and reply in a database record corresponding to the computing device. More specifically, the processor may generate and/or populate a record in a database that include the query, reply, and other information (e.g., date and time of probe).

At step 2505, the processor can determine whether any other computing devices exist on the network under examination that require probing. In response to a determination that at least one other computing device needs to be probed, the processor can complete these steps again with respect to another computing device. However, in response to a determination that no other computing devices need to be probed, the processor can examine whether it is time for the computing device to be probed another time, as shown at step 2506. Thus, the processor can immediately complete these steps again with respect to the same computing device, or the processor can wait until a specified amount of time has elapsed, as shown at step 2507.

In some embodiments, these steps are performed in parallel by the processor. For example, the processor could periodically probe the computing device over a specified time interval while simultaneously probing other computing devices on the same or different networks.

Figure 26:
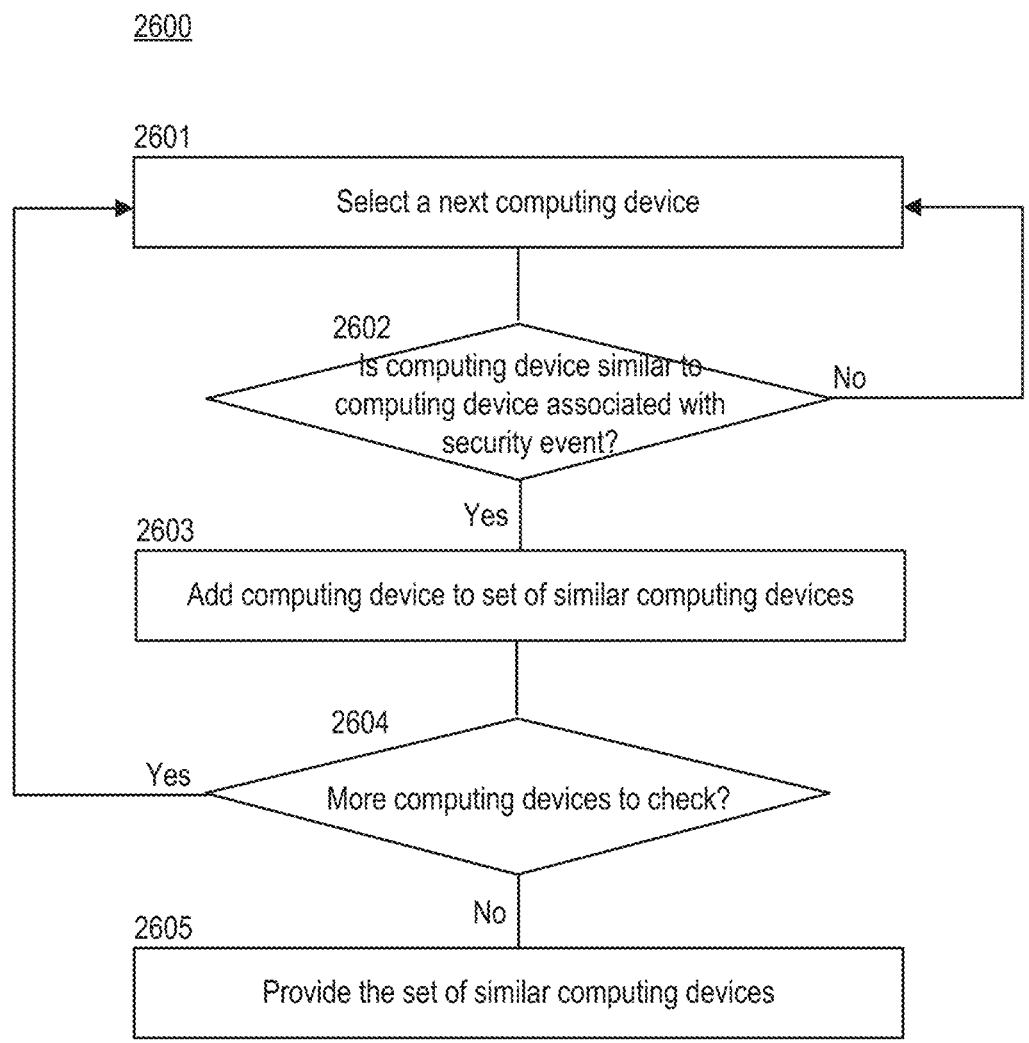
FIG. 26 depicts a flow diagram of a process for constructing a list of computing devices similar to a computing device that has experienced, or otherwise been involved in, a security event.

FIG. 26 depicts a flow diagram of a process 2600 for constructing a list of computing devices similar to a computing device that has experienced, or otherwise been involved in, a security event. Each computing device can be an internal computing device that resides on an internal network (e.g., an organization intranet) or an external computing device that resides on some other network (e.g., the Internet). A security management platform may construct a list of similar external computing devices to more quickly identify potential security risks. Additionally or alternatively, the security management platform may construct a list of similar internal computing devices to identify which computing devices have the highest likelihood of being involved in a future security event. The process may be executed by a processor of a security management platform (e.g., processor 2104 of FIG. 21).

At step 2601, the processor can select a computing device. Then, at step 2602, the processor can determine whether the computing device is similar to any computing devices that are associated with security events (also referred to as "risky computing devices" or "vulnerable computing devices"). For example, the processor may compare feature(s) of the computing device with feature(s) of all risky computing devices to determine whether any matches exist. As another example, the processor may compare service(s) executing on the computing device with service(s) executing on all vulnerable computing devices to determine whether any matches exist. In response to a determination that the computing device is not similar to any risky or vulnerable computing devices, the processor can begin the process by selecting another computing device. However, in response to a determination that the computing device is similar to at least one risky or vulnerable computing device, the processor can add the computing device to a set of similar computing devices that includes the at least one risky or vulnerable computing device, as shown at step 2603.

At step 2604, the processor determines whether there are any other computing devices to check. For example, the processor may determine whether any other computing devices exist on a computer network under examination (e.g., the internal network of an organization). If another computing device needs to be checked, the processor can complete these steps again with respect to another computing device. However, if no other computing devices need to be checked, the processor can provide the set of similar computing devices to the security management platform, as shown at step 2605. The set of similar computing devices can be used to more intelligently identify potential security risks, as well as what remediation action(s), if any, should be taken against these similar computing devices.

Figure 27:
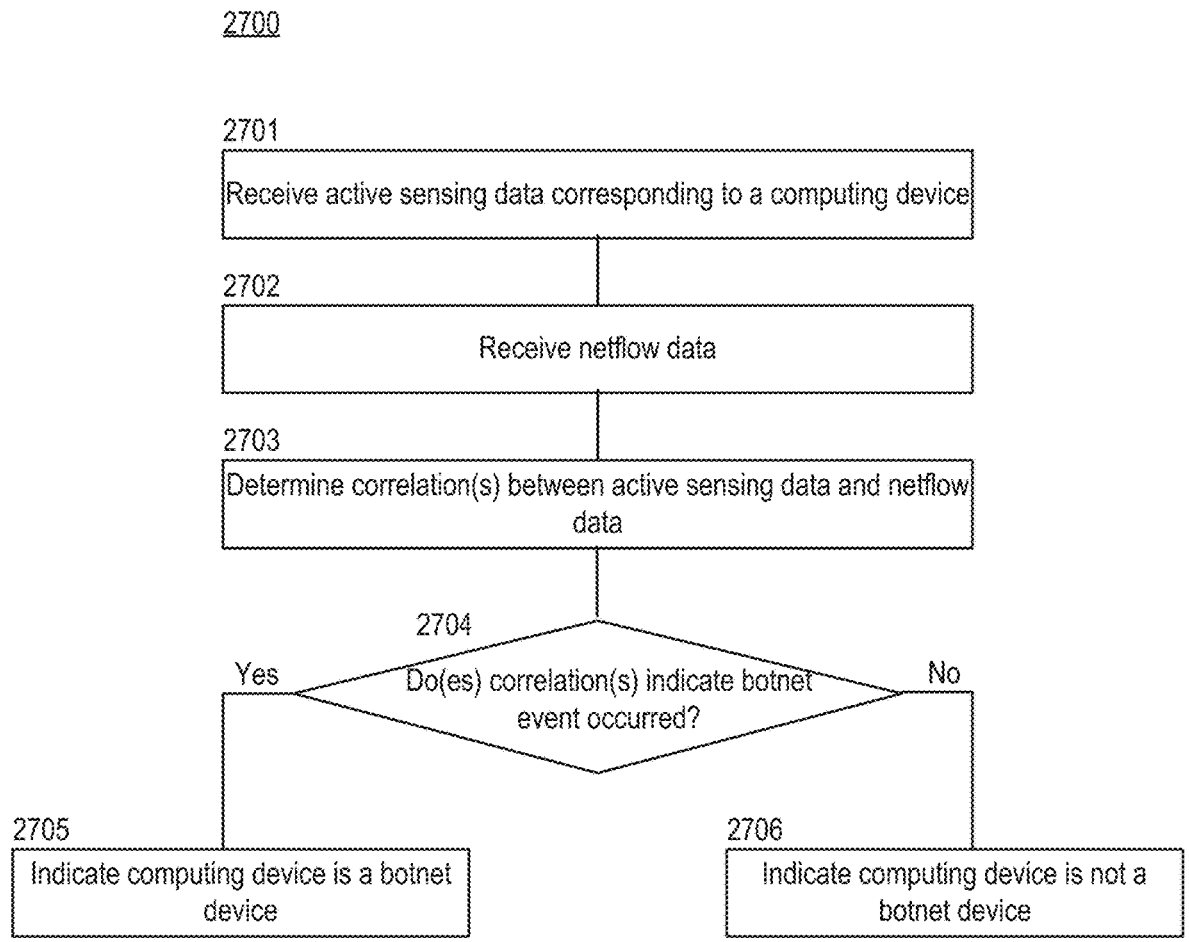
FIG. 27 depicts a flow diagram of a process for determining whether a computing device is part of a botnet.

FIG. 27 depicts a flow diagram of a process 2700 for determining whether a computing device is part of a botnet. The process may partially mirror the process of FIG. 24. Thus, steps 2701, 2702, and 2703 of FIG. 27 may be substantially similar to steps 2401, 2402, and 2403 of FIG. 24.

At step 2704, the processor can determine whether correlation(s) indicate that a botnet event occurred. Said another way, the processor can determine whether the active sensing data and/or the netflow data indicate that an internal computing device communicated with an external computing device that is likely to be part of a botnet. In the event that a determination is made that a botnet event occurred, then, at step 2705, the processor can indicate that the computing device is part of a botnet. For example, the processor may cause an alert to be generated that notifies an administrator that the computing device is a botnet device. However, in the event that a determination is made that no botnet event occurred, then, at step 2706, the processor can indicate that the computing device is not part of a botnet.

Figure 28:
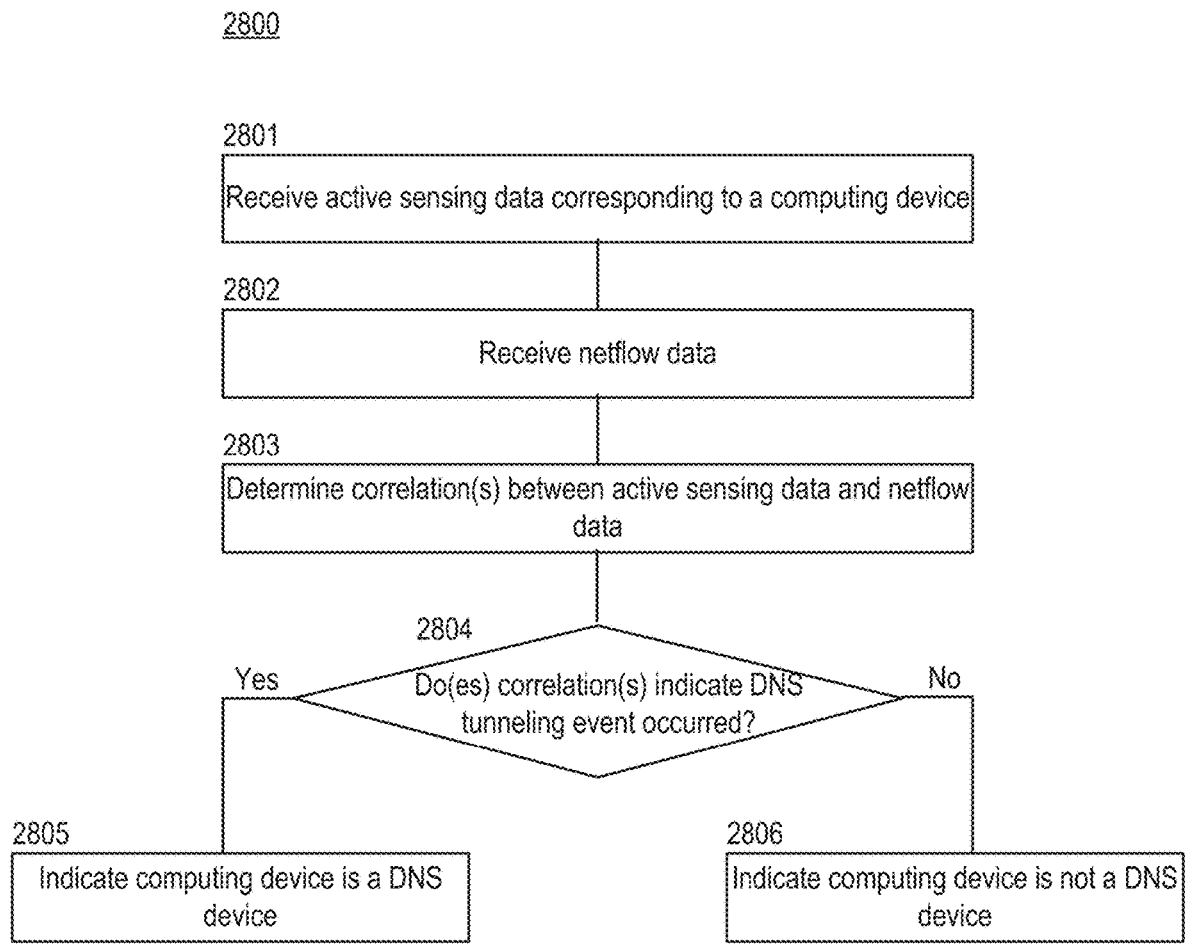
FIG. 28 depicts a flow diagram of a process for determining whether a computing device has been involved in a Domain Name Servers (DNS) tunneling event.

FIG. 28 depicts a flow diagram of a process 2800 for determining whether a computing device has been involved in a DNS tunneling event. The process may partially mirror the process of FIG. 24. Thus, steps 2801, 2802, and 2803 of FIG. 28 may be substantially similar to steps 2401, 2402, and 2403 of FIG. 24.

At step 2804, the processor can determine whether correlation(s) indicate that a DNS tunneling event occurred. DNS tunneling is the ability to encode the data of other programs or protocols in DNS queries and responses. Accordingly, in order to determine whether a DNS tunneling event occurred, the processor may examine whether communications to/from the computing device have been encoded. The processor may also perform payload analysis (e.g., by examining the size/length of the queries and responses) and/or traffic analysis (e.g., by examining the volume and frequency of the queries and responses). In the event that a determination is made that a DNS tunneling event occurred, then, at step 2805, the processor can indicate that the network device is part of a DNS tunneling scheme. For example, the processor may cause an alert to be generated that notifies an administrator that the computing is a DNS device. However, in the event that a determination is made that no DNS tunneling event occurred, then, at step 2806, the processor can indicate that the computing device is not part of a DNS tunneling scheme.

Processing System

Figure 29:
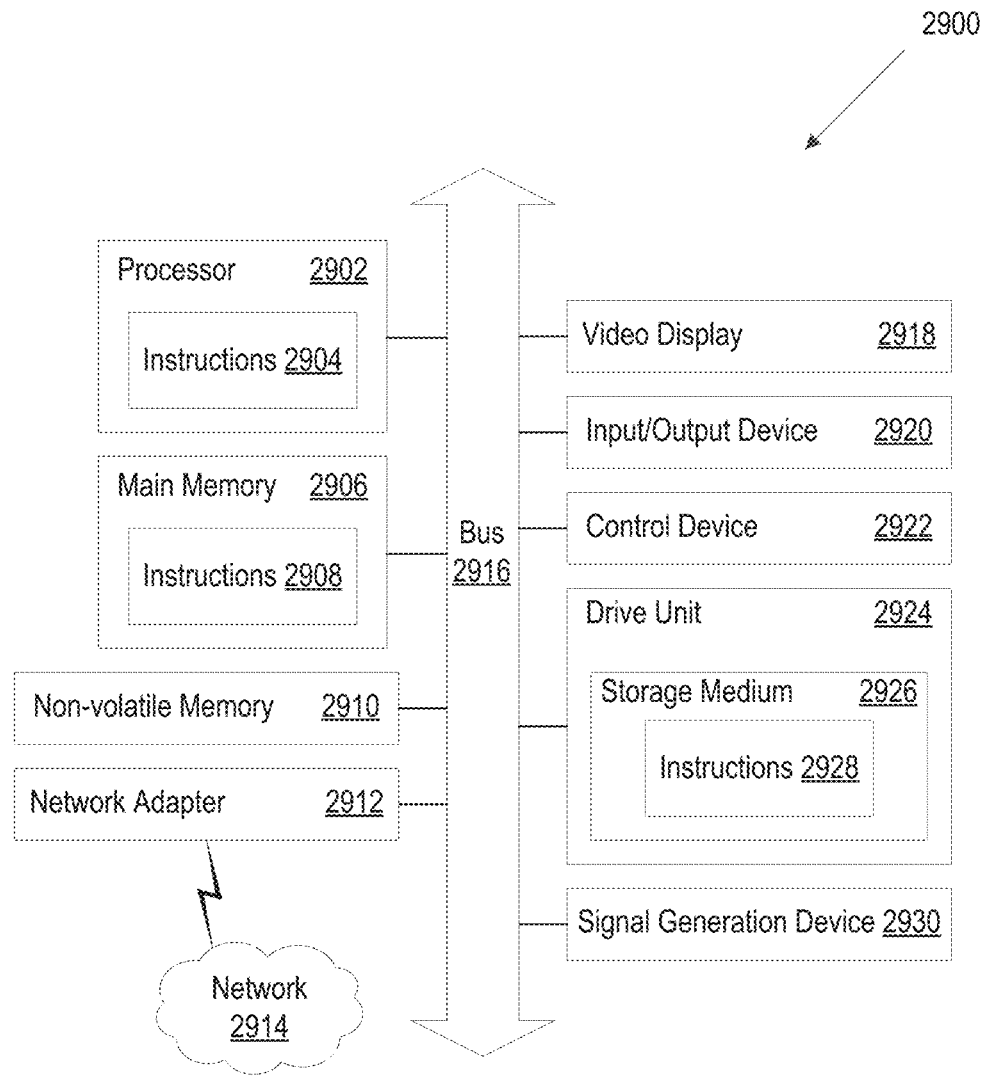
FIG. 29 is a block diagram illustrating an example of a processing system in which at least some operations described herein can be implemented.

FIG. 29 is a block diagram illustrating an example of a processing system 2900 in which at least some operations described herein can be implemented. For example, some components of the processing system 2900 may be hosted on a computing device that includes a security management platform (e.g., security management platform 506 of FIG. 5). As another example, some components of the processing system 2900 may be hosted on a computing device that is queried by a security management platform during an active probing session.

The processing system 2900 may include one or more central processing units ("processors") 2902, main memory 2906, non-volatile memory 2910, network adapter 2912 (e.g., network interface), video display 2918, input/output devices 2920, control device 2922 (e.g., keyboard and pointing devices), drive unit 2924 including a storage medium 2926, and signal generation device 2930 that are communicatively connected to a bus 2916. The bus 2916 is illustrated as an abstraction that represents one or more physical buses and/or point-to-point connections that are connected by appropriate bridges, adapters, or controllers. The bus 2916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 2900 may share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 2900.

While the main memory 2906, non-volatile memory 2910, and storage medium 2926 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 2928. The term "machine-readable medium" and "storage medium" shall also be taken to include any medium that is capable of storing, encoding, or carrying a set of instructions for execution by the processing system 2900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 2904, 2908, 2928) set at various times in various memory and storage devices in a computing device. When read and executed by the one or more processors 2902, the instruction(s) cause the processing system 2900 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 2910, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 2912 enables the processing system 2900 to mediate data in a network 2914 with an entity that is external to the processing system 2900 through any communication protocol supported by the processing system 2900 and the external entity. The network adapter 2912 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 2912 may include a firewall that governs and/or manages permission to access/proxy data in a computer network, and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method for identifying security threats to an internal network managed by an organization, the method comprising:
   identifying an internal Internet Protocol (IP) address that presently resides on the internal network;
   acquiring netflow corresponding to the internal network by
      obtaining global netflow that is representative of all traffic that traversed the Internet over a certain time interval, and
      filtering the global netflow to obtain the netflow by
         identifying (i) first traffic in the global netflow that originates from the internal network and (ii) second traffic in the global netflow that is destined for the internal network, and
         combining the first traffic and the second traffic into a single dataset to be examined as the netflow,
            wherein the netflow is representative of all traffic that traversed the internal network over the certain time interval;
   examining the netflow to detect a communication between the internal IP address and an external IP address that presently does not reside on the internal network;
   probing the external IP address by transmitting a query designed to elicit a response from a service running on the external IP address;
   receiving the response from the service running on the external IP address; and
   evaluating a risk level for the internal network based on the netflow and the response,
      wherein the risk level represents potential harm posed by the communication between the internal IP address and the external IP address.

2. The computer-implemented method of claim 1, wherein the global netflow is obtained from multiple Internet Service Providers (ISPs).

3. The computer-implemented method of claim 1, wherein said probing comprises transmitting a separate query to each external IP address of multiple external IP addresses that presently reside outside the internal network.

4. The computer-implemented method of claim 3, wherein a separate query is transmitted to each external IP address residing within the Internet Protocol version 4 (IPv4) space.

5. The computer-implemented method of claim 3, wherein a separate query is transmitted to each external IP address residing within the Internet Protocol version 6 (IPv6) space.

6. The computer-implemented method of claim 1, wherein the query is one of multiple queries transmitted to the external IP address, and wherein each query of the multiple queries is designed to elicit a response from a different service of multiple services running on the corresponding external IP address.

7. A non-transitory computer-readable medium with instructions stored thereon that, when executed by a processor, cause the processor to perform operations comprising:
   acquiring global netflow that includes all traffic that traversed the Internet over a certain time interval from multiple sources;
   filtering the global netflow to obtain local netflow for an internal network associated with an organization by—
      identifying (i) first traffic in the global netflow that originates from the internal network and (ii) second traffic in the global netflow that is destinated for the internal network, and
      combining the first traffic and the second traffic into a single dataset to be examined as the local netflow,
         wherein the local netflow includes all traffic that traversed the internal network over the certain time interval;
   examining the local netflow to detect a communication activity involving an internal Internet Protocol (IP) address that resides on the internal network and an external IP address that does not reside on the internal network; and
   evaluating a risk posed by the communication activity to the internal network based on a characteristic of the internal IP address, the external IP address, or a data packet involved in the communication activity.

8. The non-transitory computer-readable medium of claim 7, wherein the communication activity involves a transmittal of the data packet from the internal IP address to the external IP address across a boundary of the internal network.

9. The non-transitory computer-readable medium of claim 7, wherein the communication activity involves a transmittal of the data packet from the external IP address to the internal IP address across a boundary of the internal network.

10. The non-transitory computer-readable medium of claim 7, wherein the characteristic is a size of the data packet.

11. The non-transitory computer-readable medium of claim 7, the operations further comprising:
   probing the external IP address by transmitting a query designed to elicit a response from the external IP address; and
   receiving the response from the external IP address;

wherein said evaluating comprises analyzing the response to detect whether any services determined to be vulnerable to unauthorized access are running on the external IP address.

12. The non-transitory computer-readable medium of claim 7, the operations further comprising:
probing the external IP address by transmitting a query designed to elicit a response from a particular service running on the external IP address; and
in response to receiving the response,
determining that the particular service is presently running on the external IP address.

13. The non-transitory computer-readable medium of claim 7, the operations further comprising:
probing the internal IP address by transmitting a query designed to elicit a response from the internal IP address; and
receiving the response from the internal IP address;
wherein said evaluating comprises analyzing the response to detect whether any services determined to be vulnerable to unauthorized access are running on the internal IP address.

14. The non-transitory computer-readable medium of claim 7, the operations further comprising:
examining historical local netflow of the internal network under examination;
generating a threshold based at least in part on the historical local netflow; and
comparing the local netflow to the threshold,
wherein said comparing enables a determination to be made as to whether the internal network is handling larger traffic volumes than is expected based on the historical local netflow.

15. The non-transitory computer-readable medium of claim 7, the operations further comprising:
comparing the external IP address to a list of external IP addresses known to be associated with increased security risk.

16. The non-transitory computer-readable medium of claim 7, wherein the multiple sources include Internet Service Providers (ISPs), flow collectors instrumented along a boundary of the internal network, databases managed by the organization, or any combination thereof.

17. An electronic device comprising:
a memory that includes instructions for identifying security threats to a network managed by an organization, wherein the instructions, when executed by a processor, cause the processor to:
acquire global netflow that includes all traffic that traversed the Internet over a certain time interval;
filter the global netflow to obtain local netflow by—
identifying (i) first traffic in the global netflow that originates from the network and (ii) second traffic in the global netflow that is destined for the network, and
combining the first traffic and the second traffic into a single dataset to be examined as the local netflow,
wherein the local netflow includes all traffic that traversed the network over the certain time interval;
parse the local netflow to identify all communication activities involving an exchange of data packets across a boundary of the network,
wherein each communication activity involves a first Internet Protocol (IP) address that resides on the network and a second IP address that does not reside on the network;
for each communication activity,
probe the first IP address or the second IP address by transmitting a query designed to elicit a response from a service running on a targeted IP address;
store active probing data that includes all responses to transmitted queries in a repository for subsequent examination; and
evaluate a risk posed by each communication activity to the network based on the local netflow and the active probing data.

18. The electronic device of claim 17, wherein the instructions further cause the processor to:
generate a first list of all IP addresses involved in the communication activities that reside on the network;
compare the first list to a second list of all IP addresses monitored by the organization;
determine that a discrepancy exists between the first list and the second list; and
generate a notification that specifies at least one IP address was discovered in the local netflow that is not presently being monitored by the organization.

19. The electronic device of claim 17, wherein said probing is performed on a periodic basis.

20. The electronic device of claim 17, wherein the instructions further cause the processor to:
fuse the active probing data and the local netflow to create a unified workflow; and
form, based on the unified workflow, a model of an architecture of the network.

* * * * *